US010422866B2

(12) United States Patent
Shinozuka et al.

(10) Patent No.: US 10,422,866 B2
(45) Date of Patent: Sep. 24, 2019

(54) DISTANCE MEASURING APPARATUS AND DISTANCE IMAGE PHOTOGRAPHING APPARATUS

(71) Applicant: Kabushiki Kaisha Toshiba, Minato-ku (JP)

(72) Inventors: Yasuhiro Shinozuka, Fuchu (JP); Akihide Sai, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 253 days.

(21) Appl. No.: 15/691,435

(22) Filed: Aug. 30, 2017

(65) Prior Publication Data
US 2018/0259627 A1    Sep. 13, 2018

(30) Foreign Application Priority Data

Mar. 10, 2017 (JP) ................... 2017-046138

(51) Int. Cl.
| | | |
|---|---|---|
| *G01C 3/08* | (2006.01) | |
| *G01S 7/486* | (2006.01) | |
| *G01S 17/10* | (2006.01) | |
| *G01S 7/497* | (2006.01) | |
| *G01S 17/89* | (2006.01) | |
| *G01S 17/42* | (2006.01) | |

(52) U.S. Cl.
CPC .......... *G01S 7/4865* (2013.01); *G01S 7/4861* (2013.01); *G01S 7/497* (2013.01); *G01S 17/10* (2013.01); *G01S 17/89* (2013.01); *G01S 17/42* (2013.01)

(58) Field of Classification Search
CPC ...... G01S 7/4861; G01S 7/4865; G01S 17/89; G01S 17/10; G01S 17/42
USPC ...................................... 356/5.01
See application file for complete search history.

(56) References Cited

U.S. PATENT DOCUMENTS

| | | | | |
|---|---|---|---|---|
| 4,403,857 A | * | 9/1983 | Holscher | ................. G01S 17/36 |
| | | | | 342/127 |
| 4,699,508 A | | 10/1987 | Bölkow et al. | |
| 4,827,317 A | | 5/1989 | Mizushima et al. | |
| 7,522,268 B2 | * | 4/2009 | Kumagai | ................. G01C 3/08 |
| | | | | 356/4.07 |

FOREIGN PATENT DOCUMENTS

JP     2005-181039     7/2005

* cited by examiner

*Primary Examiner* — Mark Hellner
(74) *Attorney, Agent, or Firm* — Oblon, McClelland, Maier & Neustadt, L.L.P.

(57) ABSTRACT

According to an embodiment, a distance measuring apparatus includes an irradiator that emits an irradiation wave to a measuring target, a first detector that directly detects the irradiation wave, a second detector that detects a reflection wave, a simulation signal generator that generates a simulation signal, a first meter that measures a first time and an emission time of the irradiation wave, a second meter that measures a second time and an incidence time of the reflection wave, a first subtractor that subtracts the emission time from the incidence time to obtain a measurement time period, and that subtracts the first time from the second time to obtain an error time period and a second subtractor that subtracts the error time period from the measurement time period to obtain an offset measurement time period.

10 Claims, 18 Drawing Sheets

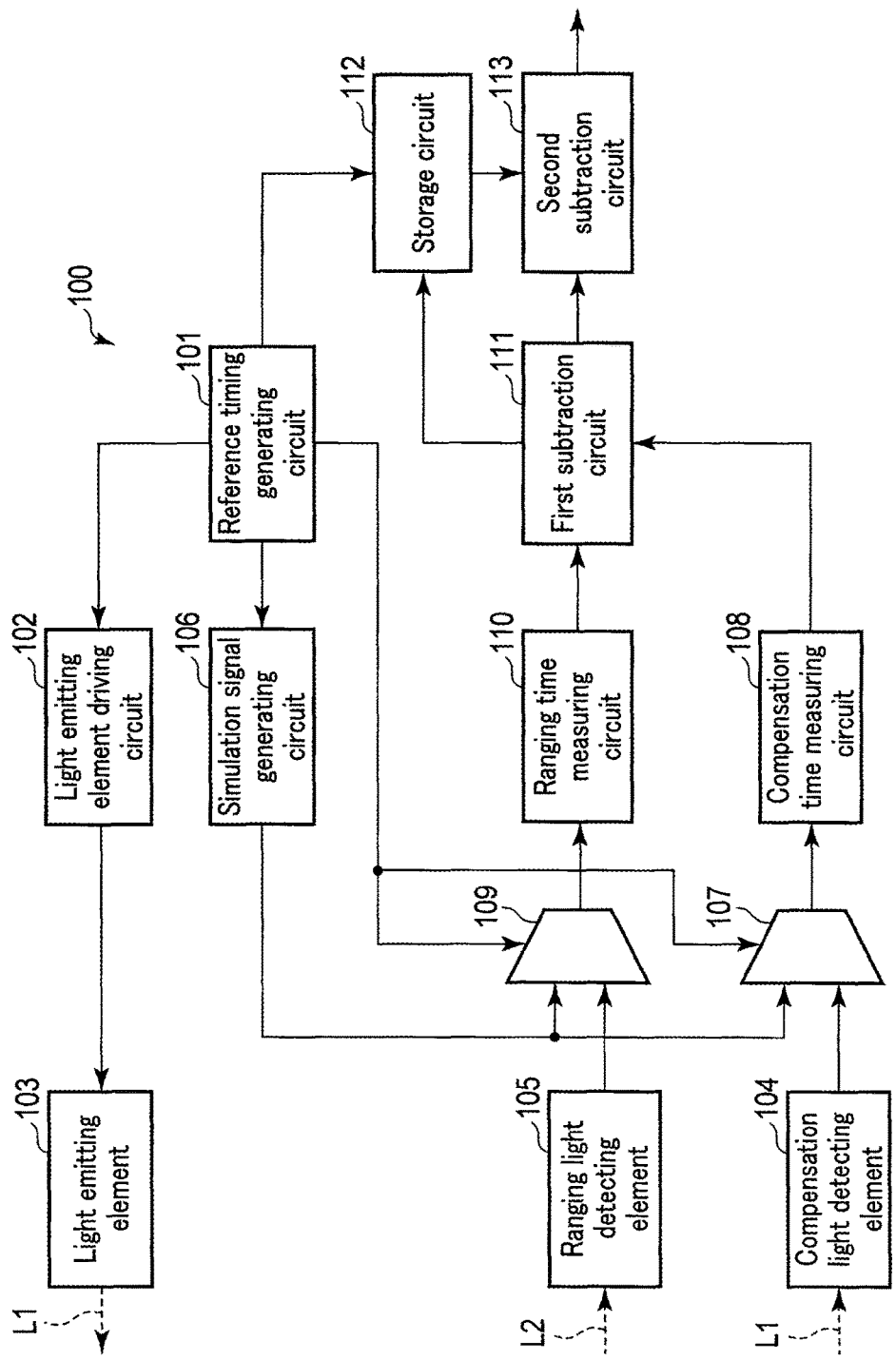
F I G. 1

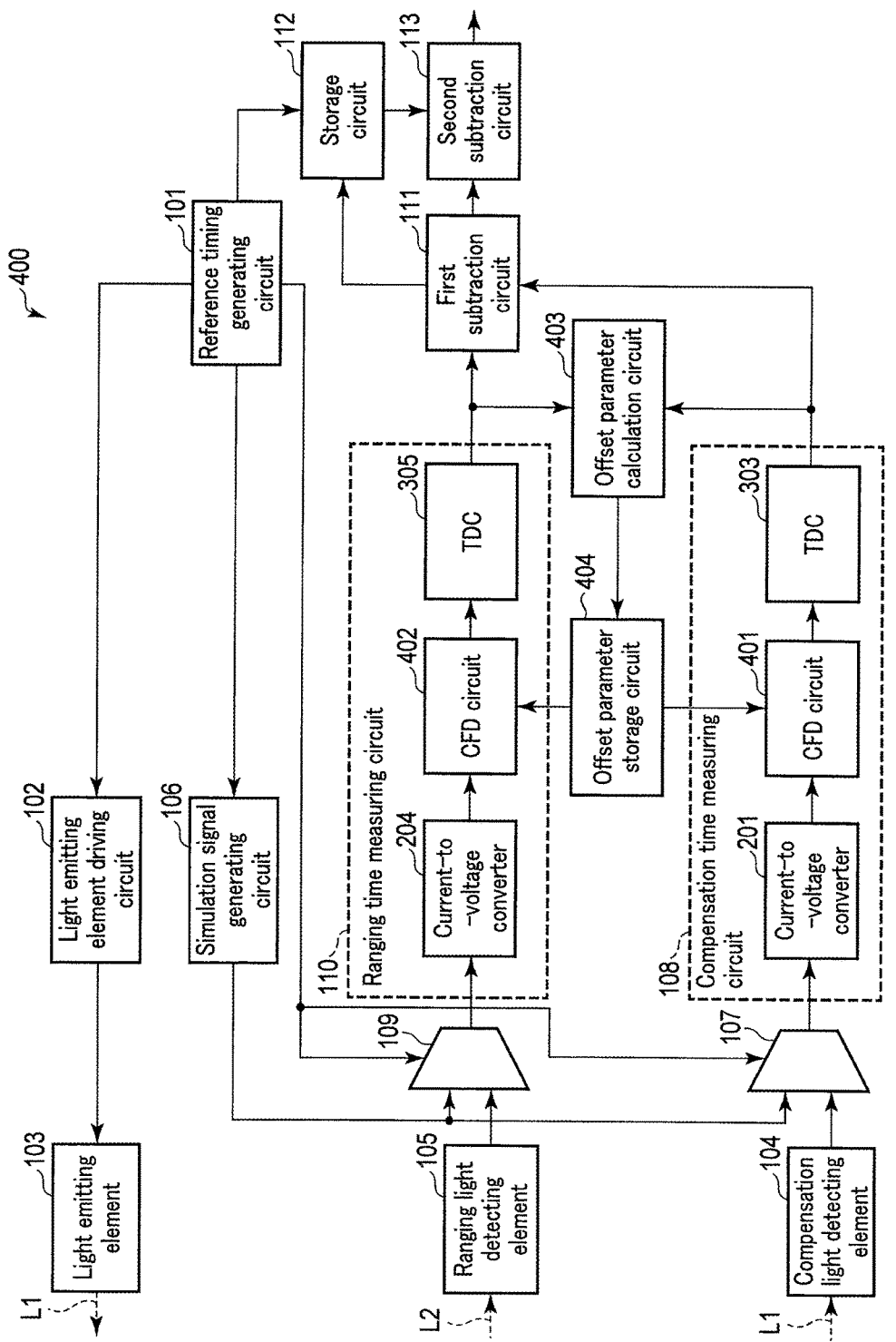
F I G. 5

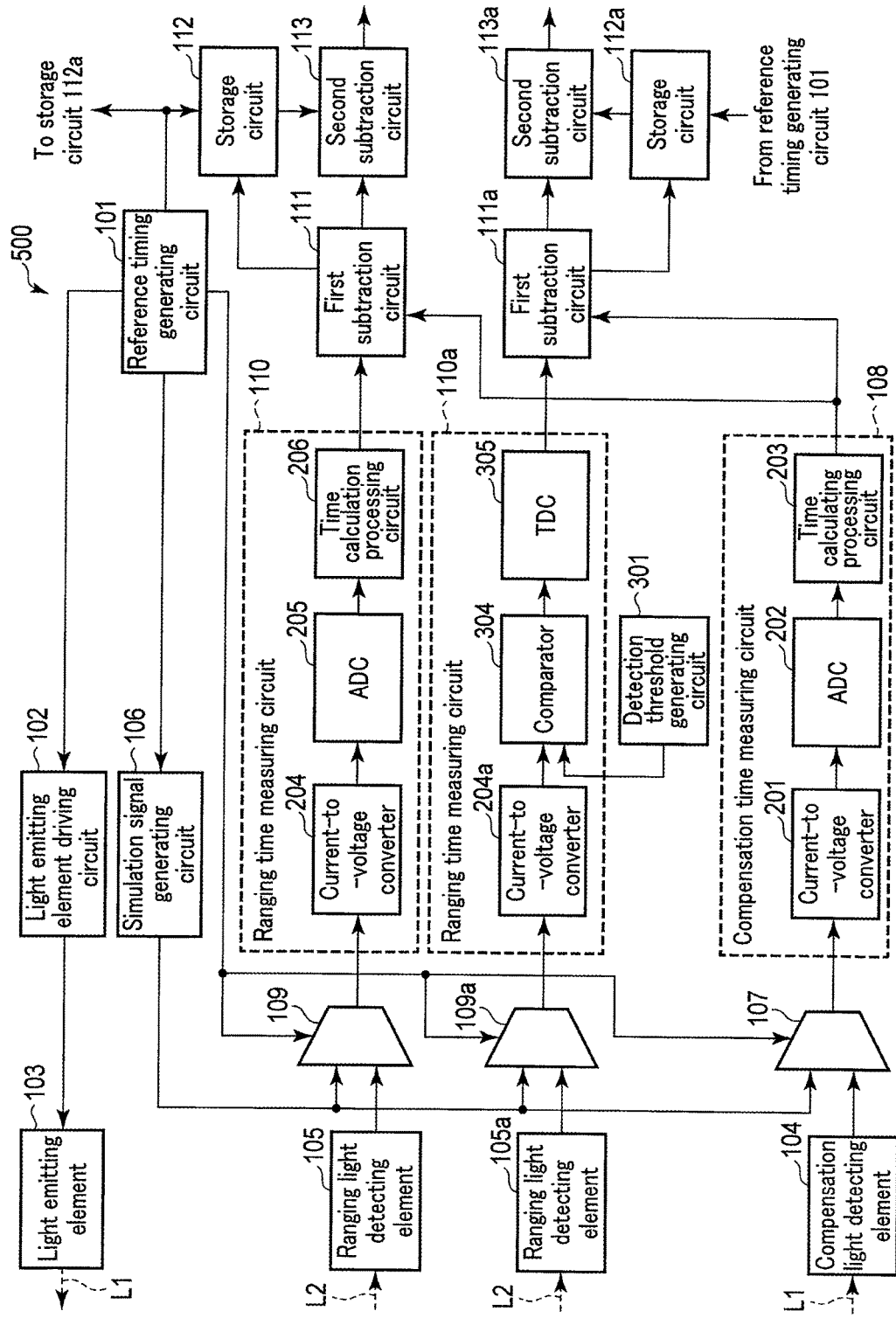
F I G. 6

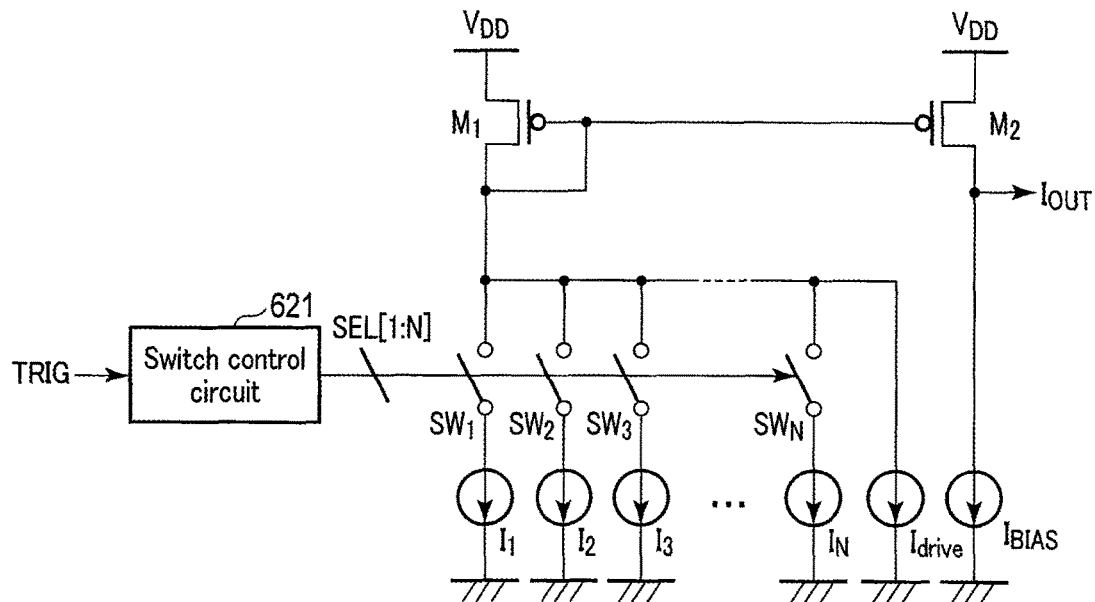
F I G. 10
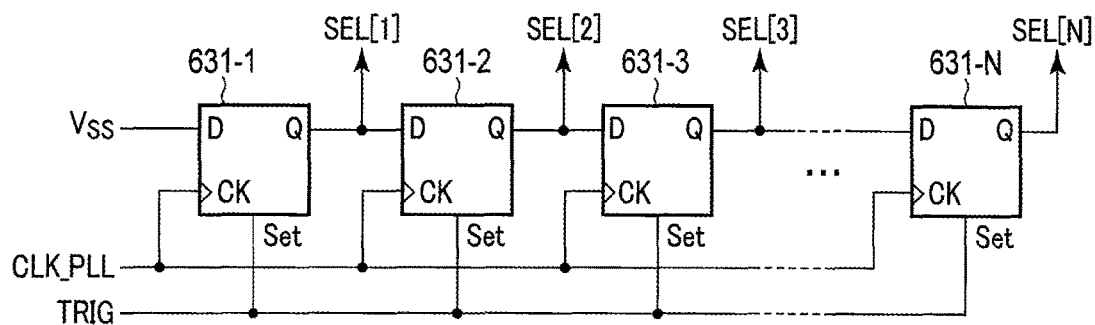
F I G. 11

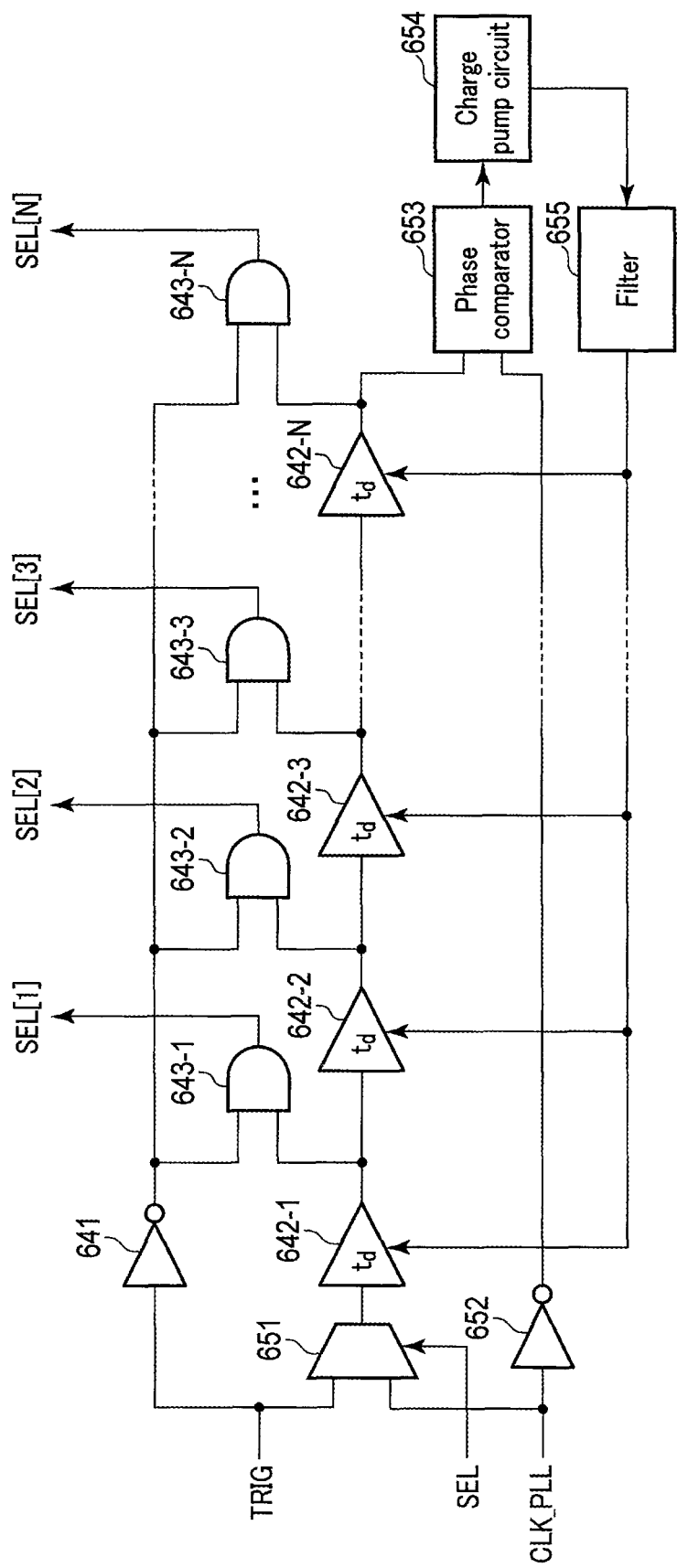
F I G. 15

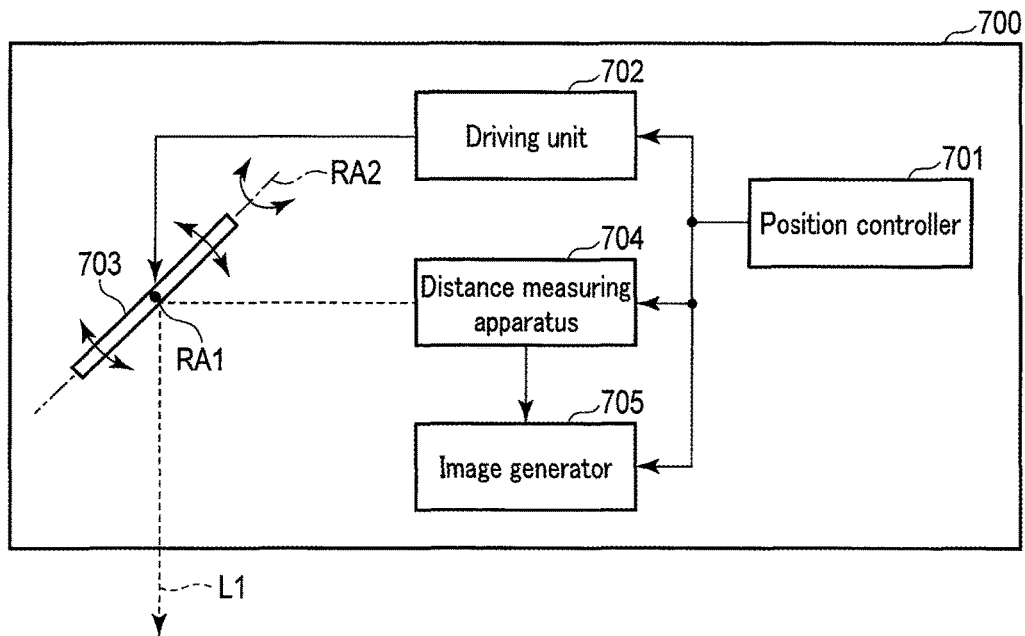
F I G. 16
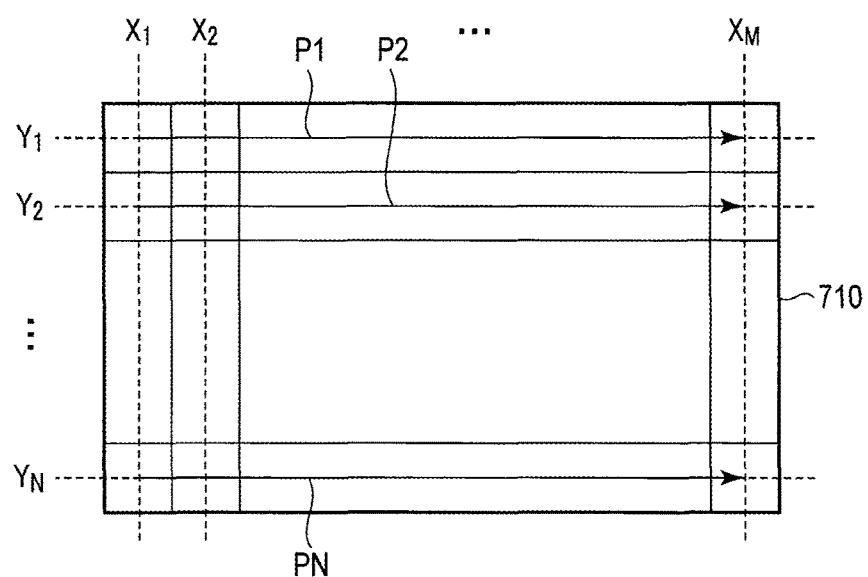
F I G. 17

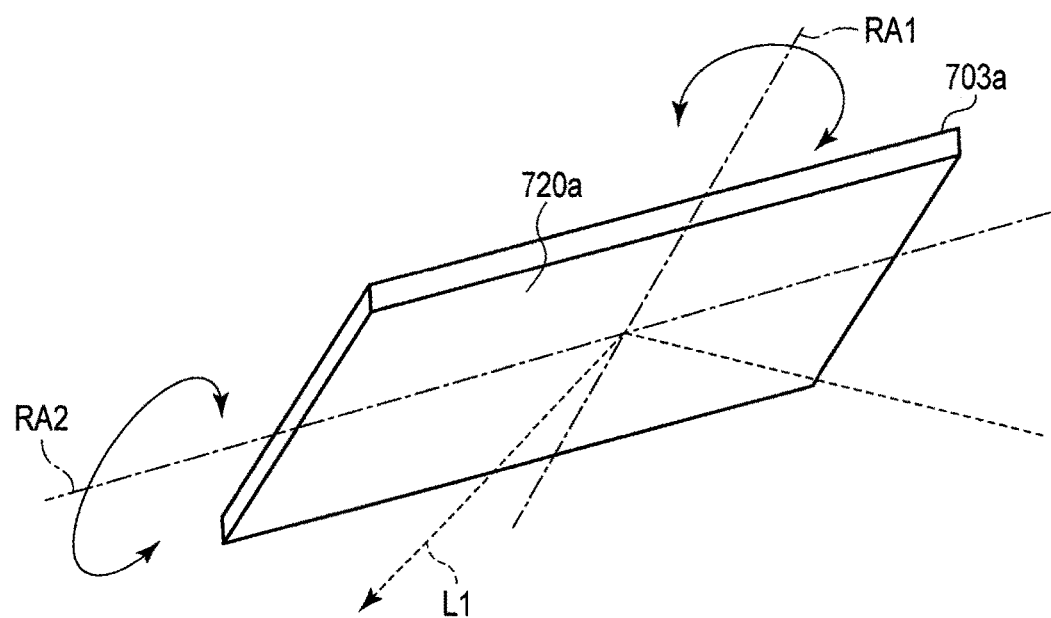
F I G. 18A
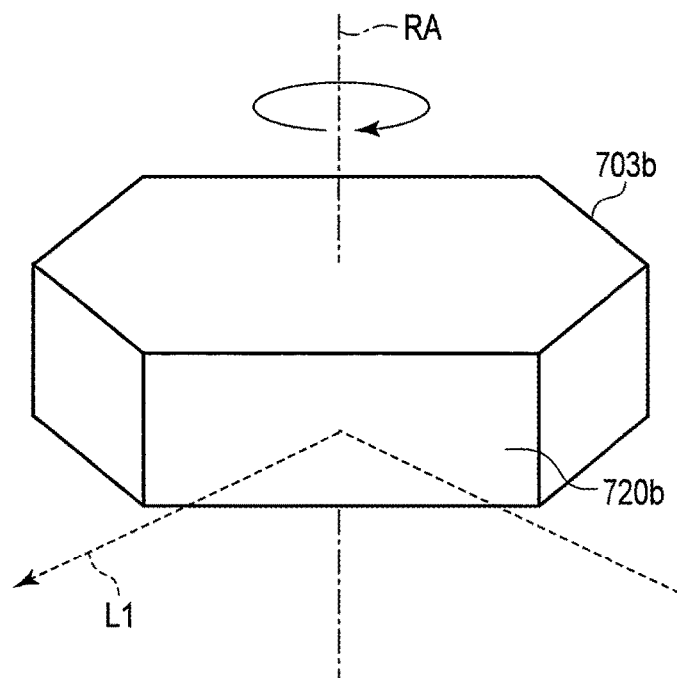
F I G. 18B

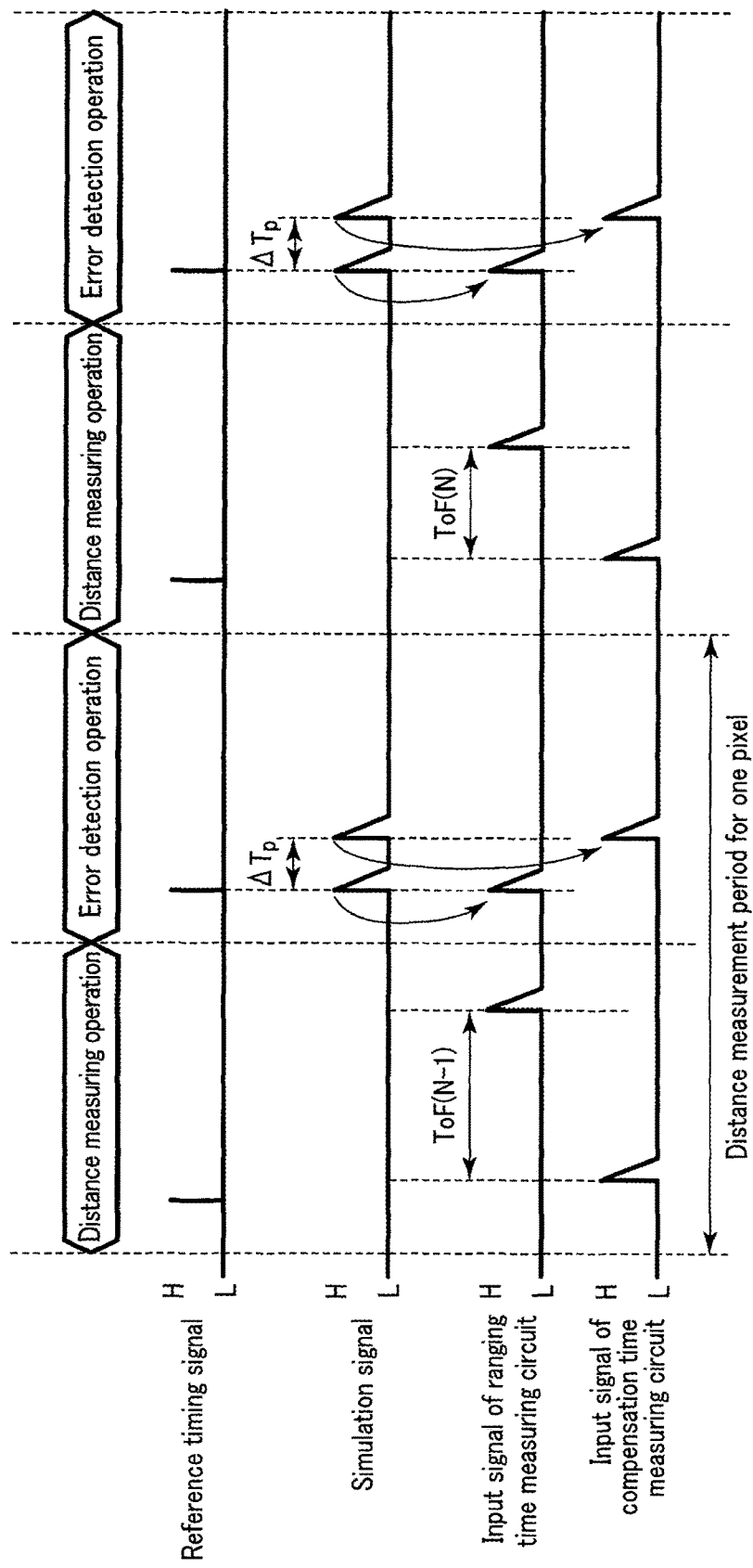
F I G. 20B

DISTANCE MEASURING APPARATUS AND DISTANCE IMAGE PHOTOGRAPHING APPARATUS

CROSS-REFERENCE TO RELATED APPLICATION

This application is based upon and claims the benefit of priority from Japanese Patent Application No. 2017-046138, filed Mar. 10, 2017, the entire contents of which are incorporated herein by reference.

FIELD

Embodiments relates to a distance measuring apparatus and a distance image photographing apparatus.

BACKGROUND

Typically, a distance measuring apparatus comprises a laser for emitting a laser beam to a measuring target, a laser driving circuit for driving the laser, a compensation detector for detecting the timing at which the laser emits the laser beam, and a ranging detector for detecting the laser beam reflected by the measuring target.

The target distance from the laser to the measuring target is calculated based on the emission time corresponding to the time at which the laser beam emitted from the laser is incident on the compensation detector and the incidence time at which the laser beam reflected by the measuring target is incident on the ranging detector. In other words, the target distance is calculated by subtracting the emission time from the incidence time and multiplying one half of the difference with the light velocity.

There is a known distance measuring apparatus which calculates a measurement time period by utilizing the phenomenon that a signal from the compensation detector is output at the same timing as a reference timing. To be more specific, the distance measuring apparatus calculates the measurement time period by causing a distance measuring circuit, which is for measuring an incidence time, to measure a timing at which that signal is output by means of an amplifier for signal detection.

According to the research by the inventor, however, the distance measuring apparatus mentioned above may not be able to correct an error that is due to the delay time of the amplifier used for detection of the signal supplied from the compensation detector. Hence, it may be that the distance measuring apparatus cannot necessarily correct a measurement time period involving errors of a plurality of circuits related to distance measurement.

BRIEF DESCRIPTION OF THE DRAWINGS

FIG. 1 is a block diagram illustrating an example of a distance measuring apparatus according to the first embodiment.

FIG. 5 is a block diagram illustrating an example of a distance measuring apparatus according to the fourth embodiment.

FIG. 6 is a block diagram illustrating an example of a distance measuring apparatus according to the fifth embodiment.

FIG. 10 is a circuit diagram illustrating an example of the SiPM simulation signal generating circuit shown in FIG. 7.

FIG. 11 is a circuit diagram illustrating an example of the switch control circuit shown in FIG. 10.

FIG. 15 is a circuit diagram illustrating an example of the switch control circuit shown in FIG. 10.

FIG. 16 is a block diagram illustrating an example of the distance image photographing apparatus according to the seventh embodiment.

FIG. 17 illustrates examples of an imaging range.

FIG. 18A illustrates an example of an MEMS mirror.

FIG. 18B illustrates an example of a rotation mirror.

FIG. 20B a timing chart exemplifying operation phases of the distance image photographing apparatus shown in FIG. 16 and operating timings of signals of the distance image photographing apparatus.

DETAILED DESCRIPTION

Figure 2:
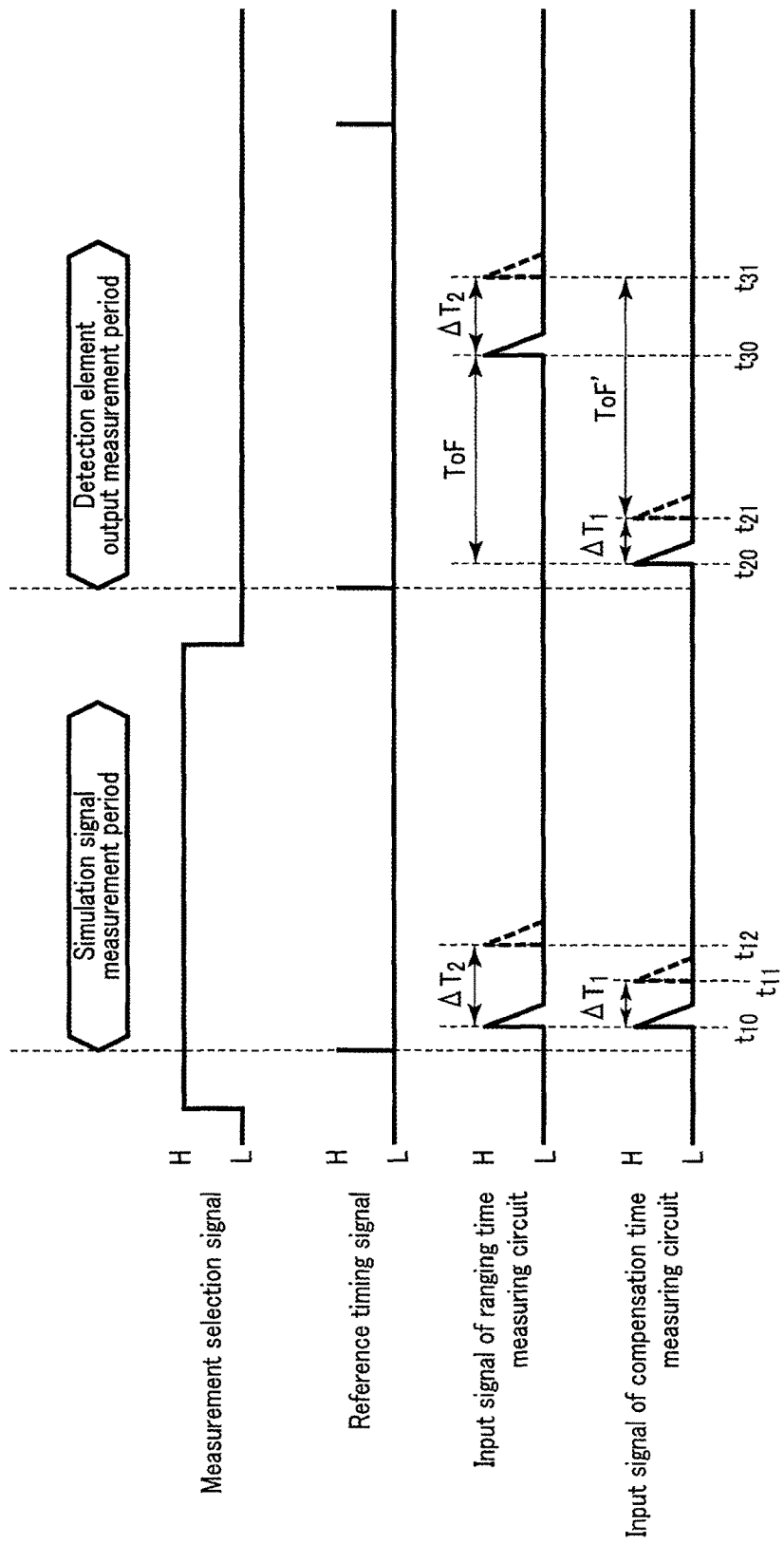
FIG. 2 is a timing chart exemplifying how signals of the distance measuring apparatus are in operation phases of the distance measuring apparatus.

A description will now be given of the embodiments with reference to the accompanying drawings. In the descriptions below, the same reference symbols will be used to denote elements similar or corresponding to described elements, and redundant descriptions will be basically omitted.

According to an embodiment, a distance measuring apparatus includes, an irradiator, a first detector, a second detector, a simulation signal generator, a first meter, a second meter, a first subtractor and a second subtractor. The irradiator emits an irradiation wave to a measuring target. The first detector directly detects the irradiation wave. The second detector detects a reflection wave, the reflection wave being the irradiation wave reflected by the measuring target. The simulation signal generator generates a simulation signal, the simulation signal being simulated waveforms of output signals of the first detector and the second detector. The first meter measures a time at which the simulation signal is received to obtain a first time, and measures a time at which an output signal from the first detector is received to obtain an emission time of the irradiation wave. The second meter measures a time at which the simulation signal is received to obtain a second time, and measures a time at which an output signal from the second detector is received to obtain an incidence time of the reflection wave. The first subtractor subtracts the emission time from the incidence time to obtain a measurement time period, and subtracts the first time from the second time to obtain an error time period, the measurement time period being regarded a distance between the irradiator and the measuring target, the error time period being a difference between a delay time of the first meter and a delay time of the second meter. The second subtractor subtracts the error time period from the measurement time period to obtain an offset measurement time period, the offset measurement time period being the measurement time period corrected for the error time period.

In the descriptions given below, reference will be made to the case where a distance is measured by use of a laser beam, but the use of the laser beam is not restrictive. An electromagnetic wave such as a radio wave may be used instead. That is, it is only required that irradiation waves (e.g., a laser beam and an electromagnetic wave such as a radio wave) outgoing from a distance measuring apparatus and their reflection waves reflected by a measuring target can be detected. The "emission time" may be regarded as "irradiation time" as long as the "emission time" indicates a time at which an irradiation wave is output from the distance measuring apparatus. It should be noted that the "irradiation time" does not mean the time at which the irradiation wave has reached the measuring target.

First Embodiment

FIG. 1 is a block diagram illustrating an example of a distance measuring apparatus according to the first embodiment. The distance measuring apparatus 100 includes a reference timing generating circuit 101, a light emitting element driving circuit 102, a light emitting element 103 (irradiator), a compensation light detecting element 104 (first detector), a ranging light detecting element 105 (second detector), a simulation signal generating circuit 106 (simulation signal generator), a selection circuit 107, a compensation time measuring circuit 108 (first meter), a selection circuit 109, a ranging time measuring circuit 110 (second meter), a first subtraction circuit 111 (first subtractor), a storage circuit 112, and a second subtraction circuit 113 (second subtractor). These circuits and elements of the distance measuring apparatus 100 are controlled by a control circuit (not shown). The distance measuring apparatus 100 may include a calculation circuit (calculation processor), not shown, used for calculating a distance from a measurement time period.

The reference timing generating circuit 101 generates signals relevant to the operations of the respective circuits of the distance measuring apparatus 100. To be more specific, the reference timing generating circuit 101 generates a reference timing signal, a measurement selection signal and a storage control signal. The reference timing signal is for controlling the operations of the light emitting element driving circuit 102 and simulation signal generating circuit 106. The measurement selection signal is for controlling the operations of the selection circuit 107 and selection circuit 109. The storage control signal is for controlling the operation of the storage circuit 112.

The reference timing generating circuit 101 supplies the reference timing signal to at least one of the light emitting element driving circuit 102 and the simulation signal generating circuit 106, supplies the measurement selection signal to the selection circuit 107 and the selection circuit 109, and supplies the storage control signal to the storage circuit 112. The signals mentioned above are signals each having time information expressed by a pulse width or the like, and may have different signal waveforms.

The light emitting element driving circuit 102 receives a reference timing signal from the reference timing generating circuit 101. In synchronism with the reference timing signal, the light emitting element driving circuit 102 pulse-drives the light emitting element 103.

The light emitting element 103 (irradiator) is, for example, a laser diode. The light emitting element 103 generates a laser beam in accordance with the reference timing signal. In other words, the light emitting element 103 emits an irradiation wave to a measuring target. In the descriptions below, the laser beam traveling from the light emitting element 103 to the measuring target will be referred to as outgoing light L1, and the laser beam reflected by the measuring target will be referred to as reflection light L2.

The compensation light detecting element 104 (first detector) is, for example, a photodiode. The compensation light detecting element 104 directly detects outgoing light L1 (irradiation wave). The compensation light detecting element 104 converts the outgoing light L1 into an electric signal (hereinafter referred to as a compensation time signal). The compensation time signal is a current signal, for example. Since the light emitting element 103 is pulse-driven, the compensation time signal output from the compensation light detecting element 104 is a pulse signal. The compensation light detecting element 104 supplies the compensation time signal to the selection circuit 107. In FIG. 1 and its subsequent Figures, an optical system that permits the compensation light detecting element 104 to directly detect the outgoing light L1 generated by the light emitting element 103 is not illustrated.

The ranging light detecting element 105 (second detector) is, for example, a photodiode. The ranging light detecting element 105 detects the outgoing light L1 (irradiation wave) reflected by a measuring target, as reflection light L2 (reflection wave). The ranging light detecting element 105 converts the reflection light L2 into an electric signal (hereinafter referred to as a ranging time signal). The ranging time signal is, for example, a current signal. Since the light emitting element 103 is pulse-driven, the ranging time signal output from the ranging light detecting element 105 is a pulse signal. The ranging light detecting element 105 supplies the ranging time signal to the selection circuit 109.

The simulation signal generating circuit 106 (simulation signal generator) receives the reference timing signal from the reference timing generating circuit 101. The simulation signal generating circuit 106 generates a simulation signal in accordance with the reference timing signal. The simulation signal is an electric signal (e.g., a current signal) that is output when a light detecting element detects a laser beam. In other words, the simulation signal generating circuit 106 generates a simulation signal which simulates the waveforms of the output signals of the compensation light detecting element 104 and the ranging light detecting element 105. Since each of the output signals of the compensation light detecting element 104 and the ranging light detecting element 105 is a pulse signal, the simulation signal is a pulse signal. The simulation signal generating circuit 106 supplies the simulation signal to both the selection circuit 107 and the selection circuit 109.

The selection circuit 107 receives the measurement selection signal from the reference timing generating circuit 101, receives the compensation time signal from the compensation light detecting element 104, and receives the simulation signal from the simulation signal generating circuit 106. The selection circuit 107 selects either the compensation time signal or the simulation signal in accordance with the measurement selection signal, and supplies the selected signal to the compensation time measuring circuit 108.

To be more specific, when the measurement selection signal is at the High level (hereinafter, H level), the selection circuit 107 selects the simulation signal and supplies the selected simulation signal to the compensation time measuring circuit 108. When the measurement selection signal is at the Low level (hereinafter, L level), the selection circuit 107 selects the compensation time signal and supplies the selected compensation time signal to the compensation time measuring circuit 108.

The compensation time measuring circuit 108 (first meter) receives either of the simulation signal and the compensation time signal from the selection circuit 107. Upon receipt of the simulation signal, the compensation time measuring circuit 108 measures the simulation signal, thereby obtaining a first time. The first time is after the triggering time of the reference timing signal, due to the delays in the internal circuits constituting the simulation signal generating circuit 106, the selection circuit 107, the compensation time measuring circuit 108, etc. The compensation time measuring circuit 108 supplies information on the first time to the first subtraction circuit 111.

Upon receipt of the compensation time signal, the compensation time measuring circuit 108 measures the compensation time signal, thereby obtaining a laser beam emitting time (emission time). This emission time is after the actual emission time, due to the delays in the internal circuits constituting the light emitting element driving circuit 102, the selection circuit 107, the compensation time measuring circuit 108, etc. The compensation time measuring circuit 108 supplies information on the emission time to the first subtraction circuit 111.

In other words, the compensation time measuring circuit 108 obtains the first time by measuring the time at which the simulation signal is received from the simulation signal generating circuit 106, and obtains the emission time of the irradiation wave by measuring the time at which the output signal of the compensation light detecting element 104 is received.

Selection circuit 109 receives the measurement selection signal from the reference timing generating circuit 101, receives the ranging time signal from the ranging light detecting element 105, and receives the simulation signal from the simulation signal generating circuit 106. Selection circuit 109 selects either of the ranging time signal and the simulation signal in accordance with the measurement selection signal and supplies the selected signal to the ranging time measuring circuit 110.

To be more specific, when the measurement selection signal is at the H level, selection circuit 109 selects the simulation signal and supplies the selected simulation signal to the ranging time measuring circuit 110. When the measurement selection signal is at the L level, selection circuit 109 selects the ranging time signal and supplies the selected ranging time signal to the ranging time measuring circuit 110.

The ranging time measuring circuit 110 (second meter) receives either of the simulation signal and the ranging time signal from selection circuit 109. Upon receipt of the simulation signal, the ranging time measuring circuit 110 measures the simulation signal, thereby obtaining a second time. The second time is after the triggering time of the reference timing signal, due to the delays in the internal circuits constituting the simulation signal generating circuit 106, selection circuit 109, ranging time measuring circuit 110, etc. The ranging time measuring circuit 110 supplies information on the second time to the first subtraction circuit 111.

Upon receipt of the ranging time signal, the ranging time measuring circuit 110 measures the ranging time signal, thereby obtaining a laser beam incidence time (incidence time). This incidence time is after the actual incidence time, due to the delays in the internal circuits constituting the light emitting element driving circuit 102, selection circuit 109, ranging time measuring circuit 110, etc. The ranging time measuring circuit 110 supplies information on the incidence time to the first subtraction circuit 111.

In other words, the ranging time measuring circuit 110 obtains the second time by measuring the time at which the simulation signal is received from the simulation signal generating circuit 106, and obtains the incidence time of the reflection wave by measuring the time at which the output signal of the ranging light detecting element 105 is received.

The first subtraction circuit 111 (first subtractor) receives information on the emission time from the compensation time measuring circuit 108 and receives information on the incidence time from the ranging time measuring circuit 110. Alternatively, the first subtraction circuit 111 receives information on the first time from the compensation time measuring circuit 108 and receives information on the second time from the ranging time measuring circuit 110.

Where the information on the emission time and the information on the incidence time are received, the first subtraction circuit 111 subtracts the emission time from the incidence time, thereby obtaining the period of time (measurement time period) required for the laser beam to travel back and forth between the distance measuring apparatus 100 and the measuring target. The first subtraction circuit 111 supplies information on the measurement time period to the second subtraction circuit 113.

Where the information on the first time and the information on the second time are received, the first subtraction circuit 111 subtracts the first time from the second time, thereby obtaining a difference (error time period) between the delay time of the compensation time measuring circuit 108 and the delay time of the ranging time measuring circuit 110. The first subtraction circuit 111 supplies information on the error time period to the storage circuit 112.

In other words, the first subtraction circuit 111 obtains the measurement time period regarding the distance between the light emitting element 103 and the measuring target by subtracting the emission time from the incidence time, and obtains the error time period, which is the difference between the delay time of the compensation time measuring circuit 108 and the delay time of the ranging time measuring circuit 110, by subtracting the first time from the second time.

The storage circuit 112 receives the storage control signal from the reference timing generating circuit 101 and information on the error time period from the first subtraction circuit 111. The storage circuit 112 stores the information on the error time period in accordance with the storage control signal. The storage circuit 112 supplies information on the error time period to the second subtraction circuit 113.

The second subtraction circuit 113 (second subtractor) receives the information on the measurement time period from the first subtraction circuit 111 and receives the information on the error time period from the storage circuit 112. The second subtraction circuit 113 obtains a measurement time period (offset measurement time period) with respect to which the error time period is corrected, by subtracting the error time period from the measurement time period. The second subtraction circuit 113 supplies information on the offset measurement time period to a calculation circuit (calculation processor), not shown, or the like.

The calculation circuit is, for example, a field programmable gate array (FPGA) or a digital signal processor (DSP). The calculation circuit calculates the distance between the light emitting element 103 and the measuring target, based on the offset measurement time period received from the second subtraction circuit 113. For example, the calculation circuit calculates the distance between the light emitting element 103 and the measuring target by multiplying one half of the offset measurement time period with the light velocity. The processing of multiplying one half of the offset measurement time period with the light velocity includes, for example, mathematically equivalent processing of multiplying the offset measurement time period with the light velocity and multiplying the resultant value by ½.

An operation of the distance measuring apparatus having the above configurations will be described with reference to FIG. 2. In the description below, the operation phases of the distance measuring apparatus 100 will be roughly classified into a simulation signal measurement period and a detection element output measurement period. The simulation signal measurement period is a period in which an error time period, the difference between the delay time of the compensation time measuring circuit 108 and the delay time of the ranging time measuring circuit 110, is acquired by measuring the simulation signal. The detection element output measurement period is a period in which a measurement time period regarding the distance between the light emitting element 103 and the measuring target is acquired by measuring an output signal from a detection element.

Initially, the reference timing generating circuit 101 generates an H-level measurement selection signal before the start of the simulation signal measurement period. Selection circuits 107 and 109 are configured, for example, such that they output a simulation signal when the measurement selection signal is at the H level.

Subsequently, the operation phase of the distance measuring apparatus 100 transitions to the simulation signal measurement period. The simulation signal measurement period starts, with the reference timing signal as a trigger, and ends when a predetermined period of time elapses.

At time $t_{10}$, the compensation time measuring circuit 108 and the ranging time measuring circuit 110 receive the simulation signal. The compensation time measuring circuit 108 obtains first time $t_{11}$ by measuring the simulation signal. The first time $t_{11}$ is a point of time determined by adding delay time $\Delta T_1$ (which is caused by the internal circuit or the like of the compensation time measuring circuit 108) to time $t_{10}$ (at which the simulation signal is actually input).

Simultaneously with the measurement by the compensation time measuring circuit 108, the ranging time measuring circuit 110 obtains second time $t_{12}$ by measuring the simulation signal. The second time $t_{12}$ is a point of time determined by adding delay time $\Delta T_2$ (which is caused by the internal circuit or the like of the ranging time measuring circuit 110) to time $t_{10}$ (at which the simulation signal is actually input).

Thereafter, the first subtraction circuit 111 subtracts the first time $t_{11}$ from the second time $t_{12}$, thereby obtaining a difference (error time period ($\Delta T_2-\Delta T_1$)) between the delay time of the compensation time measuring circuit 108 and the delay time of the ranging time measuring circuit 110. The storage circuit 112 stores the error time period ($\Delta T_2-\Delta T_1$).

Next, the reference timing generating circuit 101 generates an L-level measurement selection signal after the end of the simulation signal measurement period and before the start of the detection element output measurement period. The selection circuits 107 and 109 are configured, for example, such that the selection circuit 107 outputs the compensation time signal and the selection circuit 109 outputs the ranging time signal when the measurement selection signal is at the L level.

Subsequently, the operation phase of the distance measuring apparatus 100 transitions to the detection element output measurement period. The detection element measurement period starts, with the reference timing signal as a trigger, and ends when a predetermined period of time elapses.

At time $t_{20}$, the compensation time measuring circuit 108 receives the compensation time signal. The compensation time measuring circuit 108 obtains emission time $t_{21}$ by measuring the compensation time signal. The emission time $t_{21}$ is a point of time determined by adding delay time $\Delta T_1$ (which is caused by the internal circuit or the like of the compensation time measuring circuit 108) to time $t_{20}$ (at which an emission time signal is actually input).

At time $t_{30}$, the ranging time measuring circuit 110 receives the ranging time signal. The ranging time measuring circuit 110 obtains incidence time $t_{31}$ by measuring the ranging time signal. The incidence time $t_{31}$ is a point of time determined by adding delay time $\Delta T_2$ (which is caused by the internal circuit or the like of the ranging time measuring circuit 110) to time $t_{30}$ (at which the ranging time signal is actually input).

Thereafter, the first subtraction circuit 111 subtracts the emission time $t_{21}$ from the incidence time $t_{31}$, thereby obtaining the period of time (measurement time period ToF') required for a laser beam to travel back and forth between the distance measuring apparatus 100 and the measuring target. The second subtraction circuit 113 obtains an offset measurement time period ToF by subtracting the error time period ($\Delta T_2-\Delta T_1$) calculated in the simulation signal measurement period from the measurement time period ToF'.

As described above, in the distance measuring apparatus of the first embodiment, the compensation time measuring circuit (first meter) obtains the first time by measuring the time at which a simulation signal is received from the simulation signal generating circuit (simulation signal generator), and obtains the emission time of the irradiation wave by measuring the time at which the output signal of the compensation light detecting element (first detector) is received. In the distance measuring apparatus, the ranging time measuring circuit (second meter) obtains a second time by measuring the time at which a simulation signal is received from the simulation signal generating circuit (simulation signal generator), and obtains an incidence time of a reflection wave by measuring the time at which an output signal of the ranging light detecting element (second detector) is received. In the distance measuring apparatus, the measurement time period regarding the distance between the light emitting element (irradiator) and the measuring target is obtained by subtracting the emission time from the incidence time, and an error time period, which is the difference between the delay time of the first meter and the delay time of the second meter, is obtained by subtracting the first time from the second time. An offset measurement time period with respect to which the error time period is corrected can be obtained by subtracting the error time period from the measurement time period. That is, the distance measuring apparatus can provide a measurement time period in which the errors between a plurality of time measurement circuits related to distance measurement are corrected.

If the ambient temperature varies during an operation of the distance measuring apparatus of the first embodiment, the delay times of the circuits or the like also vary due to the temperature dependence of the circuits or the like. However, the distance measuring apparatus detects errors at regular times, based on the results of the measurement of the time at which a simulation signal is received. Therefore, the distance measuring apparatus can correct the measurement time period in accordance with how the delay times vary in response to the ambient temperature variation.

It should be noted that the subject distance measuring apparatus can be used for detecting how the surroundings of a vehicle are and for sensing an obstacle. In general, apparatuses installed on a vehicle are required to operate accurately in a wide temperature range. Since the subject distance measuring apparatus can correct a measurement time period in accordance with how delay time periods vary in response to an ambient temperature variation, it is suitable for use on a vehicle.

Second Embodiment

Figure 3:
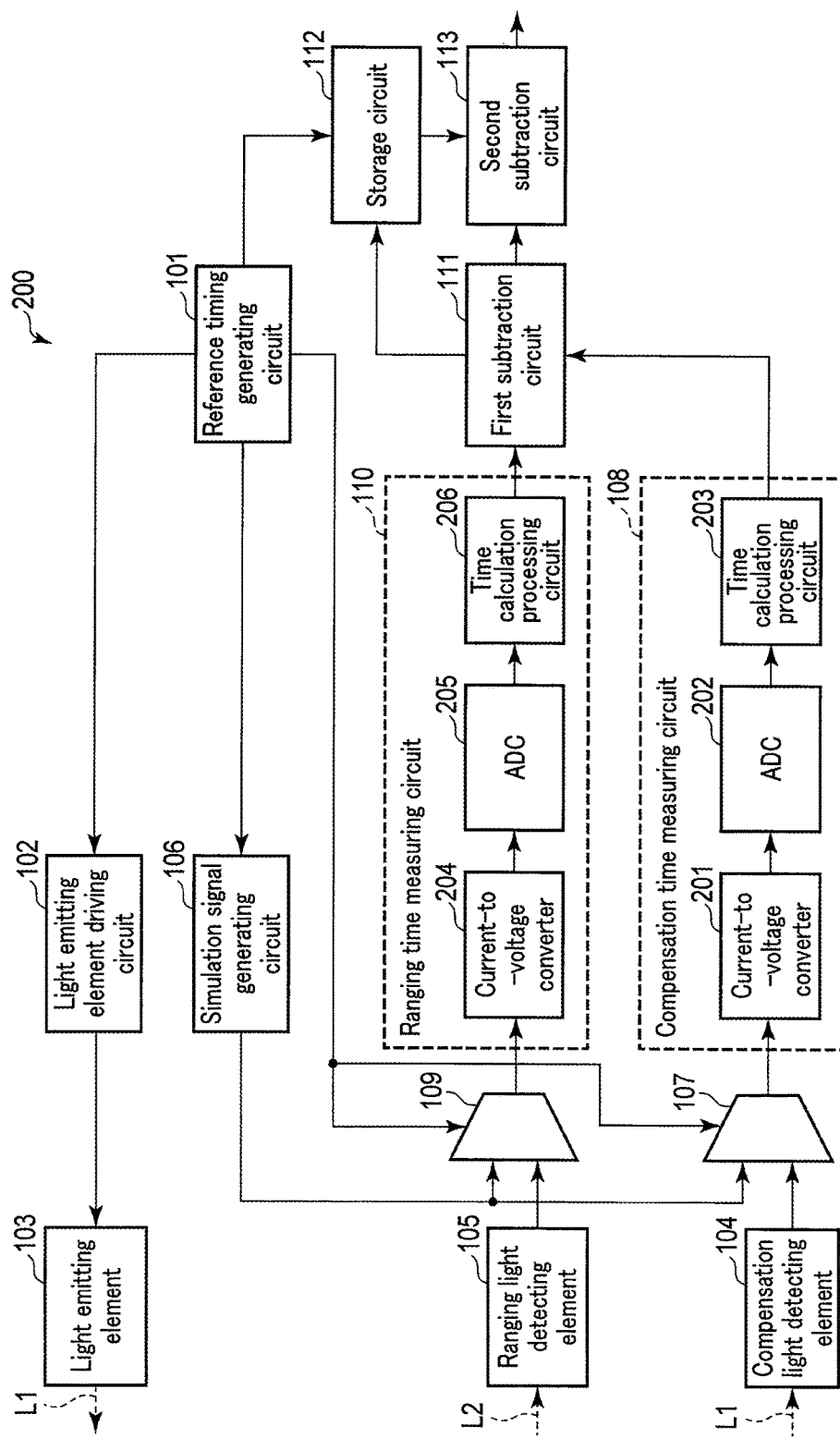
FIG. 3 is a block diagram illustrating an example of a distance measuring apparatus according to the second embodiment.

FIG. 3 is a block diagram illustrating an example of a distance measuring apparatus according to the second embodiment.

The distance measuring apparatus 200 of the second embodiment differs from the distance measuring apparatus 100 mentioned above in that specific configurations of the compensation time measuring circuit 108 and ranging time measuring circuit 110 are exemplified, as shown in FIG. 3.

The compensation time measuring circuit 108 (first meter) includes a current-to-voltage converter 201 (first current-to-voltage converter), an analog-to-digital converter (A/D converter (ADC)) 202 (first analog-to-digital converter), and a time calculation processing circuit 203 (first time calculation processor). The ranging time measuring circuit 110 (second meter) includes a current-to-voltage converter 204 (second current-to-voltage converter), An ADC 205 (second analog-to-digital converter), and a time calculation processing circuit 206 (second time calculation processor). To simplify the description of the operation of each portion, "simulation signal", "compensation time signal" and "ranging time signal" will be referred to simply as "current signal" in the description below, and "first time", "emission time", "second time" and "incidence time" will be referred to simply as "a desired time."

The current-to-voltage converter 201 (first current-to-voltage converter) receives a current signal (first current signal) from selection circuit 107. The current-to-voltage converter 201 performs current-to-voltage conversion with respect to the received current signal, thereby obtaining a first voltage signal. To be more specific, the current-to-voltage converter 201 performs current-to-voltage conversion with respect to a current signal, which is either a simulation signal or an output signal of the compensation light detecting element 104, and the first voltage signal is obtained by the conversion. Since the current signal is a pulse signal, the first voltage signal is also a pulse signal. The current-to-voltage converter 201 supplies the first voltage signal to the ADC 202.

The ADC 202 (first analog-to-digital converter) receives the first voltage signal from current-to-voltage converter 201. The ADC 202 performs analog-to-digital conversion with respect to the first voltage signal, thereby obtaining first voltage signal information (digital information). Voltage signal information is, for example, a digitized numerical sequence in which the voltage value at each point of time is expressed digitally from the rise of the signal to the fall thereof. The ADC 202 supplies the first voltage signal information to the time calculation processing circuit 203.

The time calculation processing circuit 203 (first time calculation processor) receives the first voltage signal information from the ADC 202. The Time calculation processing circuit 203 calculates either a first time or a desired time related to an emission time, based on the first voltage signal information. To be more specific, the time calculation processing circuit 203 calculates a rise time as a desired time, with a predetermined voltage value regarded as a threshold. Alternatively, the time calculation processing circuit 203 may calculate, as the desired time, a time at which the voltage value of the pulse signal peaks. The time calculation processing circuit 203 supplies information on the desired time to the first subtraction circuit 111.

The current-to-voltage converter 204 (second current-to-voltage converter) has a configuration similar to that of the current-to-voltage converter 201. The current-to-voltage converter 204 receives a current signal (second current signal) from the selection circuit 109. The current-to-voltage converter 204 performs current-to-voltage conversion with respect to the received current signal, thereby obtaining a second voltage signal. To be more specific, the current-to-voltage converter 204 performs current-to-voltage conversion with respect to a current signal, which is either a simulation signal or an output signal of the ranging light detecting element 105, and the second voltage signal is obtained by the conversion. Since the current signal is a pulse signal, the second voltage signal is also a pulse signal. The current-to-voltage converter 204 supplies the second voltage signal to the ADC 205.

The ADC 205 (second analog-to-digital converter) has a configuration similar to that of the ADC 202. The ADC 205 receives the second voltage signal from the current-to-voltage converter 204. The ADC 205 performs analog-to-digital conversion with respect to the second voltage signal, thereby obtaining second voltage signal information (digital information). The ADC 205 supplies the second voltage signal information to the time calculation processing circuit 206.

The time calculation processing circuit 206 (second time calculation processor) has a configuration similar to that of the time calculation processing circuit 203. The time calculation processing circuit 206 receives the second voltage signal information from The ADC 205. The time calculation processing circuit 206 calculates either a second time or a desired time related to an incidence time, based on the second voltage signal information. The time calculation processing circuit 206 supplies information on the desired time to the first subtraction circuit 111.

As described above, each of the compensation the time measuring circuit (first meter) and the ranging time measuring circuit (second meter) includes a current-to-voltage converter, an ADC and a time calculation processing circuit (time calculation processor). Like the distance measuring apparatus of the first embodiment, the distance measuring apparatus can provide a measurement time period in which the errors between a plurality of time measurement circuits related to distance measurement are corrected.

Ideally, the current-to-voltage converter shown in FIG. 3 should have an infinite frequency band. An ideal current-to-voltage converter is featured in that a current signal input thereto and a voltage signal output therefrom are proportional to each other. Therefore, the input signal and the output signal correspond to each other in terms of the timing of the rise of a pulse signal and the timing of the peak of the pulse signal.

However, an actual current-to-voltage converter has a finite frequency band. Because of this, a voltage signal output from the actual current-to-voltage converter has a waveform that does not exactly correspond to the waveform of the current signal input to the actual current-to-voltage converter. As a result, the timing of the rise of the output voltage signal and the timing of the peak thereof include lags depending upon the frequency band. In addition, the frequency band may vary due to the characteristic differences among elements and the ambient temperature variation. For this reason, a time measurement result may include an error attributable to the characteristic differences among elements and the ambient temperature variation.

Such an error can be corrected by the distance measuring apparatus of the second embodiment because it can correct errors between a plurality of time measurement circuits related to distance measurement.

Third Embodiment

Figure 4:
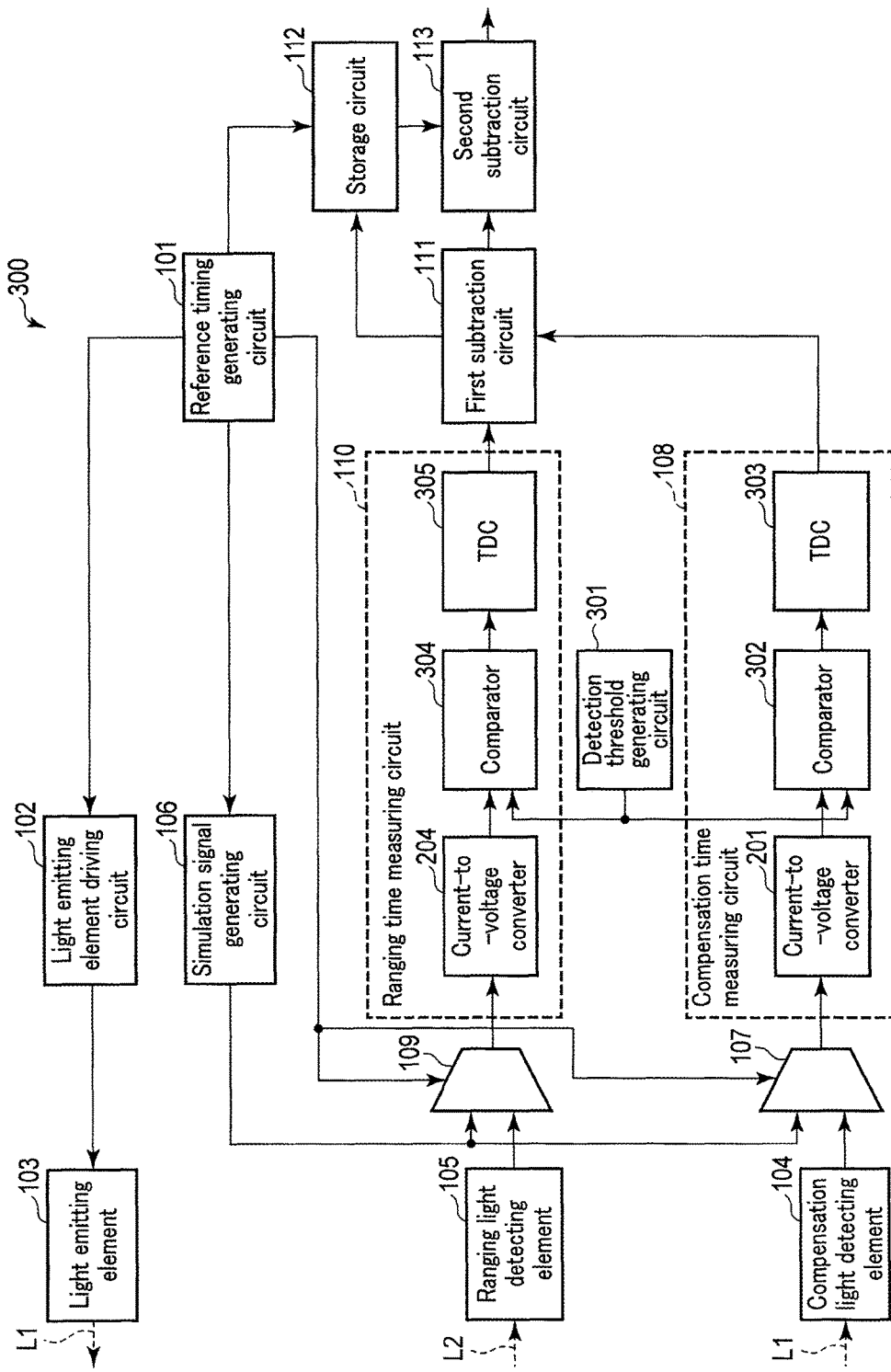
FIG. 4 is a block diagram illustrating an example of a distance measuring apparatus according to the third embodiment.

FIG. 4 is a block diagram illustrating an example of a distance measuring apparatus according to the third embodiment.

The distance measuring apparatus 300 of the third embodiment differs from the distance measuring apparatus 200 mentioned above in terms of the configurations of the compensation time measuring circuit 108 and the ranging time measuring circuit 110. To be more specific, the distance measuring apparatus 300 further includes a detection threshold generating circuit 301 (threshold value generator), as shown in FIG. 4. The compensation time measuring circuit 108 (first meter) includes a current-to-voltage converter 201 (first current-to-voltage converter), a comparator 302 (first comparator), and a time-to-digital converter (TDC) 303 (first time-to-digital converter). The ranging time measuring circuit 110 includes a current-to-voltage converter 204 (second current-to-voltage converter), a comparator 304 (second comparator), and a TDC 305 (second time-to-digital converter).

The detection threshold generating circuit 301 (threshold value generator) generates a threshold voltage. The threshold voltage is a predetermined voltage value used, for example, to detect the rise of a signal. The detection threshold generating circuit 301 supplies a signal of a threshold voltage (threshold voltage signal) to both the comparator 302 and the comparator 304.

The current-to-voltage converter 201 (first current-to-voltage converter) receives a current signal (first current signal) from the selection circuit 107. The current-to-voltage converter 201 performs current-to-voltage conversion with respect to the received current signal, thereby obtaining a first voltage signal. To be more specific, the current-to-voltage converter 201 performs current-to-voltage conversion with respect to a current signal, which is either a simulation signal or an output signal of the compensation light detecting element 104, and the first voltage signal is obtained by the conversion. The current-to-voltage converter 201 supplies the first voltage signal to the comparator 302.

The comparator 302 (first comparator) receives the first voltage signal from the current-to-voltage converter 201 and receives the threshold voltage signal from the detection threshold generating circuit 301. The comparator 302 compares the voltage of the first voltage signal and the voltage of the threshold voltage signal with each other, and generates a first time signal based on the result of comparison. A time signal mentioned here is a signal having time information expressed by a pulse width or the like. To be more specific, the comparator 302 generates an L-level time signal when the voltage of the voltage signal is lower than the voltage of the threshold voltage signal, and generates an H-level time signal when the voltage of the voltage signal exceeds the voltage of the threshold voltage signal. The comparator 302 supplies the first time signal to the TDC 303.

The TDC 303 (first time-to-digital converter) receives the first time signal from the comparator 302. The TDC 303 performs time-to-digital conversion with respect to the first time signal, thereby generating information on a desired time of a first time or an emission time. To be more specific, the TDC 303 determines that the desired time is, for example, the timing at which a time signal changes from the L level to the H level (rise time). Alternatively, the TDC 303 may hold data on the rise time and the timing at which the time signal changes from the H level to the L level (fall time) and determine that the desired time is any point of time between the rise time and the fall time. The TDC 303 supplies information on the desired time to the first subtraction circuit 111.

The current-to-voltage converter 204 (second current-to-voltage converter) has a configuration similar to that of the current-to-voltage converter 201. The current-to-voltage converter 204 receives a current signal (second current signal) from the selection circuit 109. The current-to-voltage converter 204 performs current-to-voltage conversion with respect to the received current signal, thereby obtaining a second voltage signal. To be more specific, the current-to-voltage converter 204 performs current-to-voltage conversion with respect to a current signal, which is either a simulation signal or an output signal of the ranging light detecting element 105, and the second voltage signal is obtained by the conversion. The current-to-voltage converter 204 supplies the second voltage signal to the comparator 304.

The comparator 304 has a configuration similar to that of the comparator 302. The comparator 304 receives the second voltage signal from the current-to-voltage converter 204 and receives the threshold voltage signal from the detection threshold generating circuit 301. The comparator 304 compares the voltage of the second voltage signal and the voltage of the threshold voltage signal with each other, and generates a second time signal based on the result of comparison. The comparator 304 supplies the second time signal to the TDC 305.

The TDC 305 (second time-to-digital converter) has a configuration similar to that of the TDC 303. The TDC 305 receives the second time signal from the comparator 304. The TDC 305 performs time-to-digital conversion with respect to the second time signal, thereby generating information on a desired time of a second time or an incidence time. The TDC 305 supplies information on the desired time to the first subtraction circuit 111.

As described above, each of the compensation time measuring circuit (first meter) and the ranging time measuring circuit (second meter) includes a current-to-voltage converter (current-to-voltage converter), a comparator (comparison unit) and a TDC (time-to-digital converter). Like the distance measuring apparatus of the first embodiment, the distance measuring apparatus can provide a measurement time period in which the errors between a plurality of time measurement circuits related to distance measurement are corrected.

Fourth Embodiment

A distance measuring apparatus according to the fourth embodiment will be described.

Generally speaking, the amplitude of an output signal of a current-to-voltage converter varies, depending upon the emission intensity of a light-emitting element, the reflectance of a measuring target, the sensitivity of a detecting element, the conversion gain of a current-to-voltage converter, etc. Therefore, a comparator configured to perform comparison based on a predetermined voltage may have problems in that the timing of an output signal and the timing of a threshold voltage are shifted from each other. Therefore, a time measurement result may include an error. To solve this problem, the distance measuring apparatus 400 of the fourth embodiment employs a constant fraction discriminator (CFD) circuit which can detect a signal at constant timings without reference to the magnitude of the amplitude.

FIG. 5 is a block diagram illustrating an example of the distance measuring apparatus of the fourth embodiment. The distance measuring apparatus 400 of the fourth embodiment differs from the distance measuring apparatuses 200 and 300 mentioned above in terms of the configurations of the compensation time measuring circuit 108 and the ranging time measuring circuit 110. To be more specific, as shown in FIG. 5, the compensation time measuring circuit 108 includes a current-to-voltage converter 201 (first current-to-voltage converter), a CFD circuit 401 (first processor), and a TDC 303 (first time-to-digital converter). The ranging time measuring circuit 110 includes a current-to-voltage converter 204 (second current-to-voltage converter), a CFD circuit 402 (second processor), and a TDC 305 (second time-to-digital converter). The distance measuring apparatus 400 further includes an offset parameter calculation circuit 403 (offset parameter operation unit) and an offset parameter storage circuit 404. The simulation signal generating circuit 106 of the distance measuring apparatus 400 may generate a plurality of simulation signals of different amplitudes at the instruction of the offset parameter calculation circuit 403 or the like.

The current-to-voltage converter 201 (first current-to-voltage converter) receives a current signal (first current signal) from the selection circuit 107. The current-to-voltage converter 201 performs current-to-voltage conversion with respect to the received current signal, thereby obtaining a first voltage signal. To be more specific, the current-to-voltage converter 201 performs current-to-voltage conversion with respect to a current signal, which is either a simulation signal or an output signal of the compensation light detecting element 104, and the first voltage signal is obtained by the conversion. The current-to-voltage converter 201 supplies the first voltage signal to the CFD circuit 401.

The CFD circuit 401 (first processor) receives the first voltage signal from the current-to-voltage converter 201 and receives an offset parameter from the offset parameter storage circuit 404. The offset parameter is a parameter used for setting, for example, an offset, a delay time, an attenuation time of a comparator, which is an internal circuit of the CFD circuit 401. That is, the offset parameter is used for correcting a measurement error attributable to an amplitude. With the parameter of the internal circuit being set by the offset parameter, the CFD circuit 401 generates a first time signal indicating the timing at which an attenuation signal (first attenuation signal) obtained by attenuating the first voltage signal and a delay signal (first delay signal) obtained by delaying the first voltage signal are simultaneous. A time signal mentioned here is a signal having time information expressed by a pulse width or the like. The CFD circuit 401 supplies the first time signal to the TDC 303.

The TDC 303 (first time-to-digital converter) receives the first time signal from the CFD circuit 401. The TDC 303 performs time-to-digital conversion with respect to the first time signal, thereby generating information on a desired time of a first time or an emission time. To be more specific, The TDC 303 determines that the desired time is, for example, the timing at which a time signal changes from the L level to the H level (rise time). The TDC 303 supplies information on the desired time to both the offset parameter calculation circuit 403 and the first subtraction circuit 111.

The current-to-voltage converter 204 (second current-to-voltage converter) has a configuration similar to that of the current-to-voltage converter 201. The current-to-voltage converter 204 receives a current signal (second current signal) from the selection circuit 109. The current-to-voltage converter 204 performs current-to-voltage conversion with respect to the received current signal, thereby obtaining a second voltage signal. To be more specific, the current-to-voltage converter 204 performs current-to-voltage conversion with respect to a current signal, which is either a simulation signal or an output signal of the ranging light detecting element 105, and a second voltage signal is obtained by the conversion. The current-to-voltage converter 204 supplies the second voltage signal to the CFD circuit 402.

The CFD circuit 402 (second processor) has a configuration similar to that of the CFD circuit 401. The CFD circuit 402 receives the second voltage signal from the current-to-voltage converter 204 and receives an offset parameter from the offset parameter storage circuit 404. With the parameter of the internal circuit being set by the offset parameter, the CFD circuit 402 generates a second time signal indicating the timing at which an attenuation signal (second attenuation signal) obtained by attenuating the second voltage signal and a delay signal (second delay signal) obtained by delaying the second voltage signal are simultaneous. The CFD circuit 402 supplies the second time signal to the TDC 305.

The TDC 305 (second time-to-digital converter) has a configuration similar to that of the TDC 303. The TDC 305 receives the second time signal from the CFD circuit 402. The TDC 305 performs time-to-digital conversion with respect to the second time signal, thereby generating information on a desired time of a second time or an incidence time. The TDC 305 supplies information on the desired time to both the offset parameter calculation circuit 403 and the first subtraction circuit 111.

The offset parameter calculation circuit 403 (offset parameter calculation processor) receives information (measurement results) on a desired time from both the TDC 303 and the TDC 305. The measurement results mentioned here are information on the first time and information on the second time. Based on the measurement results calculated from simulation signals of different amplitudes, the offset parameter calculation circuit 403 calculates offset parameters corresponding to the CFD circuit 401 and the CFD circuit 402. The offset parameter calculation circuit 403 supplies the offset parameters to the offset parameter storage circuit 404.

The offset parameter storage circuit 404 receives the offset parameters from the offset parameter calculation circuit 403. The offset parameter storage circuit 404 supplies the offset parameters to the CFD circuit 401 and the CFD circuit 402.

As described above, each of the compensation time measuring circuit (first meter) and the ranging time measuring circuit (second meter) includes a current-to-voltage converter (first or second current-to-voltage converter), a CFD circuit (processor) and a TDC (time-to-digital converter). In addition, the distance measuring apparatus 400 further includes the offset parameter calculation circuit 403 (offset parameter calculation processor) and the offset parameter storage circuit 404. Like the distance measuring apparatus of the first embodiment, the distance measuring apparatus can provide a measurement time period in which the errors between a plurality of time measurement circuits related to distance measurement are corrected. Moreover, the distance measuring apparatus is configured to set an internal parameter for the CFD circuit based on an offset parameter used for correcting an amplitude-dependent measurement error. With this configuration, signals can be detected at constant timings without reference to the magnitudes of the amplitudes. According to the present embodiment, the characteristics of the time measurement circuit can be adjusted in such a manner as to minimize the residual components of an amplitude-dependent distance error, which may be caused due to the non-ideality of the time measurement circuit which corrects the distance error dependent on the amplitudes of output signals of the compensation light detecting element 104 and the ranging light detecting element 105.

Fifth Embodiment

A distance measuring apparatus according to the fifth embodiment will be described.

In general, the intensity of a laser beam incident on a light detector is inversely proportional to the square of the distance to a measuring target. Where the distance to the measuring target is short, the amplitude ratio of a reflection-wave signal to noise (including the unnecessary components of environment light and noise of the measurement circuit) takes a large value (i.e., the S/N ratio is high). In this case, easy measurement can be performed using a comparator and a TDC. On the other hand, where the distance to the measuring target is long, the S/N ratio is low. In this case, comparison by a comparator is hard to perform, and measurement has to be performed using an ADC and a time calculation processing circuit.

However, the time resolution of an ADC is lower than that of a TDC. Therefore, a measurement circuit using the ADC is inferior to a measurement circuit using the TDC in that the distance resolution related to the time resolution is inevitably low.

To sum up, the measurement circuit using the ADC has high resistance to noise but provides a low time resolution, while the measurement circuit using the TDC has low resistance to noise but provides a high time resolution.

FIG. 6 is a block diagram illustrating an example of the distance measuring apparatus of the fifth embodiment. The distance measuring apparatus 500 of the fifth embodiment differs from the distance measuring apparatuses 100, 200, 300 and 400 mentioned above in that it employs two circuit systems for obtaining an incidence time. For example, the distance measuring apparatus 500 includes a first system in which a ranging time measuring circuit includes an ADC and a second system in which a ranging time measuring circuit includes a TDC. That is, the distance measuring apparatus 500 can obtain two substantially similar measurement time periods (offset measurement time periods) by means of two ranging time measuring circuits of different configurations The first system includes a ranging light detecting element 105 (second detector), a selection circuit 109, a ranging time measuring circuit 110 (second meter), a first subtraction circuit 111 (first subtractor), a storage circuit 112 and a second subtraction circuit 113 (second subtractor), which correspond to respective components of the distance measuring apparatus 200. Ranging time measuring circuit 110 includes a current-to-voltage converter 204, an ADC 205 and a time calculation processing circuit 206.

The second system includes a ranging light detecting element 105a (third detector), a selection circuit 109a, a ranging time measuring circuit 110a (third meter), a first subtraction circuit 111a (third subtractor), storage circuit 112a and a second subtraction circuit 113a (fourth subtractor), which correspond to respective components of the distance measuring apparatus 300. The ranging time measuring circuit 110a includes a current-to-voltage converter 204a (third current-to-voltage converter), a comparator 304 (third comparator) and a TDC 305 (third time-to-digital converter).

The reference timing generating circuit 101 supplies a measurement selection signal to selection circuit 109a as well, and supplies a storage control signal to storage circuit 112a as well.

The ranging light detecting element 105a (third detector) is a photodiode, for example. The ranging light detecting element 105a detects the outgoing light L1 (irradiation wave) reflected by a measuring target, as reflection light L2 (reflection wave). The ranging light detecting element 105a converts the reflection light L2 into an electric signal (hereinafter referred to as a second ranging time signal). The second ranging time signal is a current signal, for example. Since the light emitting element 103 is pulse-driven, the second ranging time signal output from the ranging light detecting element 105a is a pulse signal. The ranging light detecting element 105a supplies the second ranging time signal to the selection circuit 109a.

The simulation signal generating circuit 106 generates a simulation signal which simulates the waveforms of the output signals of the compensation light detecting element 104, the ranging light detecting element 105 and the ranging light detecting element 105a. Since each of the output signals of the compensation light detecting element 104, the ranging light detecting element 105 and the ranging light detecting element 105a is a pulse signal, the simulation signal is a pulse signal. The simulation signal generating circuit 106 supplies the simulation signal to the selection circuit 107, the selection circuit 109 and the selection circuit 109a.

The selection circuit 109a receives a measurement selection signal from the reference timing generating circuit 101, receives the second ranging time signal from the ranging light detecting element 105a, and receives the simulation signal from the simulation signal generating circuit 106. The selection circuit 109a selects either of the second ranging time signal and the simulation signal in accordance with the measurement selection signal, and supplies the selected signal to the ranging time measuring circuit 110a.

The ranging time measuring circuit 110a (third meter) receives either of the simulation signal and the second ranging time signal from the selection circuit 109a. Upon receipt of the simulation signal, the ranging time measuring circuit 110*a* measures the simulation signal, thereby obtaining a third time. The third time is after the triggering time of the reference timing signal, due to the delays in the internal circuits constituting the simulation signal generating circuit 106, the selection circuit 109*a*, the ranging time measuring circuit 110*a*, etc. The ranging time measuring circuit 110*a* supplies information on the third time to the first subtraction circuit 111*a*.

Upon receipt of the second ranging time signal, the ranging time measuring circuit 110*a* measures the second ranging time signal, thereby obtaining a laser beam incidence time (second incidence time). This second incidence time is after the actual incidence time, due to the delays in the internal circuits constituting the light emitting element driving circuit 102, the selection circuit 109*a*, the ranging time measuring circuit 110*a*, etc. The ranging time measuring circuit 110*a* supplies information on the second incidence time to the first subtraction circuit 111*a*.

In other words, the ranging time measuring circuit 110*a* obtains the third time by measuring the time at which the simulation signal is received from the simulation signal generating circuit 106, and obtains the second incidence time of the reflection wave by measuring the time at which the output signal of the ranging light detecting element 105*a* is received.

The first subtraction circuit 111*a* (third subtractor) receives information on the emission time from the compensation time measuring circuit 108 and receives information on the incidence time from the ranging time measuring circuit 110*a*. Alternatively, the first subtraction circuit 111*a* receives information on the first time from the compensation time measuring circuit 108 and receives information on the third time from the ranging time measuring circuit 110*a*.

Where the information on the emission time and the information on the second incidence time are received, the first subtraction circuit 111*a* subtracts the emission time from the second incidence time, thereby obtaining the period of time (second measurement time period) required for the laser beam to travel back and forth between the distance measuring apparatus 500 and the measuring target. The first subtraction circuit 111*a* supplies information on the second measurement time period to the second subtraction circuit 113*a*.

Where the information on the first time and the information on the third time are received, the first subtraction circuit 111*a* subtracts the first time from the third time, thereby obtaining a difference (second error time period) between the delay time of the compensation time measuring circuit 108 and the delay time of the ranging time measuring circuit 110*a*. The first subtraction circuit 111*a* supplies information on the second error time period to the storage circuit 112*a*.

In other words, the first subtraction circuit 111*a* obtains the measurement time period regarding the distance between the light emitting element 103 and the measuring target by subtracting the emission time from the second incidence time, and obtains the second error time period, which is the difference between the delay time of the compensation time measuring circuit 108 and the delay time of the ranging time measuring circuit 110*a*, by subtracting the first time from the third time.

The storage circuit 112*a* receives a storage control signal from the reference timing generating circuit 101 and the information on the second error time period from the first subtraction circuit 111*a*. The storage circuit 112*a* stores the information on the second error time period in accordance with the storage control signal. The storage circuit 112*a* supplies the information on the second error time period to the second subtraction circuit 113*a*.

The second subtraction circuit 113*a* (fourth subtractor) receives the information on the second measurement time period from the first subtraction circuit 111*a* and receives the information on the error time period from the storage circuit 112*a*. The second subtraction circuit 113*a* obtains a measurement time period (second offset measurement time period) with respect to which the second error time period is corrected, by subtracting the second error time period from the second measurement time period. The second subtraction circuit 113*a* supplies information on the second offset measurement time period to a calculation circuit (calculator), not shown, or the like.

The calculation circuit (not shown) calculates a second distance between the light emitting element 103 and the measuring target, based on the second offset measurement time period received from the second subtraction circuit 113*a*. The second distance is substantially equal to the distance calculated from the offset measurement time period of the first system.

The distance measuring apparatus 500 may simultaneously use both the first system and the second system, for distance measurement; alternatively, it may switch between the first system and the second system. The fist system is suitable for measuring long distances because it employs an ADC and advantageously avoids inclusion of noise (including the unnecessary components of environment light and noise of the measurement circuit). The second system is suitable for measuring short distances because it employs a TDC and ensures a high distance resolution.

For example, where the first system and the second system are simultaneously employed, the distance measuring apparatus 500 obtains two offset measurement time periods, namely, an offset measurement time period of the first system and an offset measurement time period of the second system. The two offset measurement time periods are suitably processed by a circuit not shown.

Where the first system and the second system are switchably used, the distance measuring apparatus 500 may switch between the first system and the second system in accordance with a distance to be measured. To be more specific, the distance measuring apparatus 500 uses the first system where the distance to be measured is, for example, 10 meters or longer, and uses the second system where the distance to be measured is shorter than 10 meters.

With the above configurations, two ranging time measuring circuits (second meter and third meter) of different configurations are employed. Like the distance measuring apparatus of the first embodiment, the distance measuring apparatus can provide a measurement time period in which the errors between a plurality of time measurement circuits related to distance measurement are corrected. Moreover, the distance measuring apparatus can measure a distance using a system suitable for that distance, and the measurement accuracy can be enhanced. Where a ranging time measuring circuit including an analog-to-digital converter and a ranging time measuring circuit including a time-to-digital converter are employed, the systems simply including these ranging time measuring circuits cause mutually different distance errors. In the present embodiment, a subtractor and a storage circuit are provided for each of the systems, so that a measurement time period in which the errors of the ranging time difference circuits are corrected can be obtained.

Sixth Embodiment

A distance measuring apparatus according to the sixth embodiment will be described.

The distance measuring apparatus 600 of the sixth embodiment employs a photomultiplier for the detection of a laser beam. In the present embodiment, a silicon photomultiplier (SiPM) is employed, but this is not restrictive.

In general, the amount of light incident on a light detector is inversely proportional to the square of the distance to a measuring target. For this reason, a light detector configured to measure long distances requires high sensitivity. The SiPM mentioned above is suitable for measuring long distances because it outputs a pulse current in response to one photon with a certain probability. A signal output from the SiPM has a waveform in which the signal sharply rises at the timing of the incidence of a photon and thereafter decreases exponentially with time constant τ.

Figure 7:
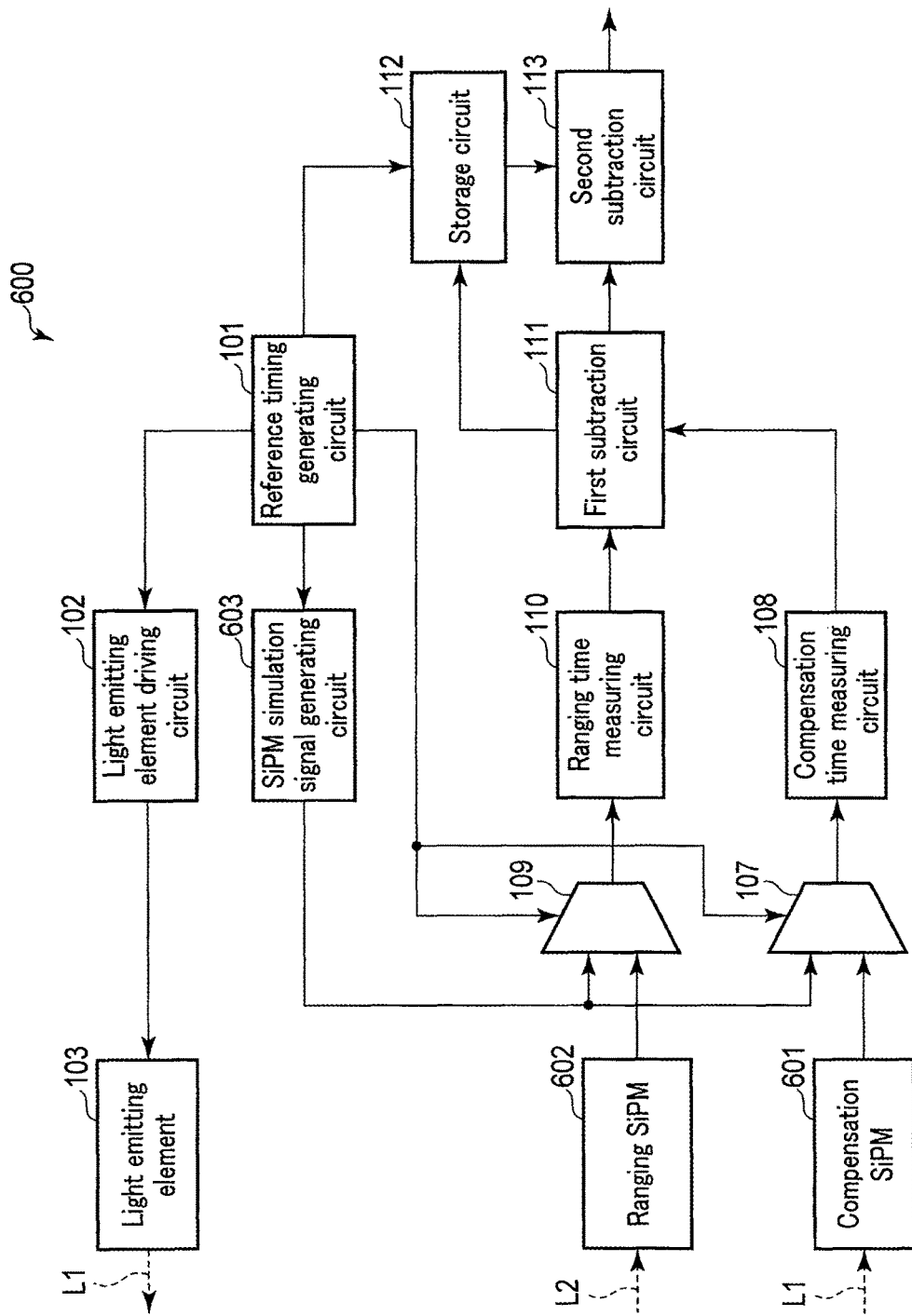
FIG. 7 is a block diagram illustrating an example of a distance measuring apparatus according to the sixth embodiment.

FIG. 7 is a block diagram illustrating an example of the distance measuring apparatus of the sixth embodiment. The distance measuring apparatus 600 includes a reference timing generating circuit 101, a light emitting element driving circuit 102, a light emitting element 103, a compensation SiPM 601 (first detector), a ranging SiPM 602 (second detector), an SiPM simulation signal generating circuit 603 (simulation signal generator), a selection circuit 107, a compensation time measuring circuit 108, a selection circuit 109, a ranging time measuring circuit 110, a first subtraction circuit 111, a storage circuit 112, and a second subtraction circuit 113.

The compensation SiPM 601 (first detector) 104 directly detects outgoing light L1 (irradiation wave). The compensation SiPM 601 converts the outgoing light L1 into an electric signal (hereinafter referred to as a compensation time signal). The compensation time signal is a current signal, for example. The compensation SiPM 601 supplies the compensation time signal to selection circuit 107. In FIG. 7, an optical system that permits the compensation SiPM 601 to directly detect the outgoing light L1 generated by the light emitting element 103 is not illustrated.

The ranging SiPM 602 (second detector) detects the outgoing light L1 (irradiation wave) reflected by a measuring target, as reflection light L2 (reflection wave). The ranging SiPM 602 converts the reflection light L2 into an electric signal (hereinafter referred to as a ranging time signal). The ranging time signal is a current signal, for example. The ranging SiPM 602 supplies the ranging time signal to the selection circuit 109.

The SiPM simulation signal generating circuit 603 (simulation signal generator) receives a reference timing signal from the reference timing generating circuit 101. The SiPM simulation signal generating circuit 603 generates a simulation signal in accordance with the reference timing signal. The simulation signal is an electric signal (e.g., a current signal) which is output when an SiPM detects a laser beam. In other words, the SiPM simulation signal generating circuit 603 generates a simulation signal which simulates the waveforms of the output signals of the compensation SiPM 601 and the ranging SiPM 602. The SiPM simulation signal generating circuit 603 supplies the simulation signal to both the selection circuit 107 and the selection circuit 109.

Figure 8:
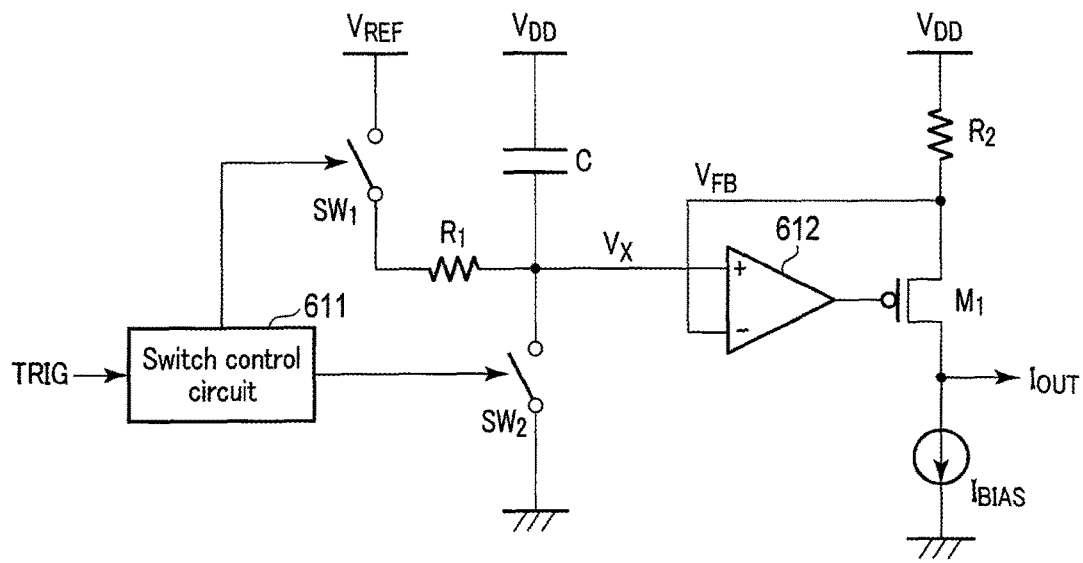
FIG. 8 is a circuit diagram illustrating an example of the SiPM simulation signal generating circuit shown in FIG. 7.

FIG. 8 shows a first specific example of the SiPM simulation signal generating circuit 603. The SiPM simulation signal generating circuit 603 shown in FIG. 8 includes a switch control circuit 611, switch $SW_1$, capacitor C, resistor $R_1$, switch $SW_2$, resistor $R_2$, an amplifier 612, a P-type MOS transistor $M_1$ and a current source $I_{BIAS}$.

The switch control circuit 611 receives a reference timing signal (TRIG) from the reference timing generating circuit 101. Based on the reference timing signal, the switch control circuit 611 generates a first control signal for controlling switch $SW_1$ and a second control signal for controlling switch $SW_2$. Each control signal is configured, for example, such that a switch is closed (ON state) when the control signal is at the H level and is opened (OFF state) when the control signal is at the L level. The switch control circuit 611 supplies the first control signal to switch $SW_1$ and supplies the second control signal to switch $SW_2$.

Switch $SW_1$ is connected to reference voltage $V_{REF}$ at one end, and is connected to one end of resistor $R_1$ at the other end. Switch $SW_1$ receives the first control signal from the switch control circuit 611. Switch $SW_1$ is switched between the ON state and the OFF state in accordance with the first control signal.

Capacitor C is connected to power source $V_{DD}$ at one end, and is connected, at the other end, to the other end of resistor $R_1$, the positive-phase input terminal of the amplifier 612 and one end of switch $SW_2$. Capacitor C is charged when switch $SW_1$ is closed and switch $SW_2$ is open.

At one end, resistor $R_1$ is connected to the other end of switch $SW_1$, and at the other end, resistor $R_1$ is connected to the other end of capacitor C, the positive-phase input terminal of the amplifier 612 and one end of switch $SW_2$.

At one end, switch $SW_2$ is connected to the other end of capacitor C, the other end of resistor $R_1$ and the positive-phase input terminal of the amplifier 612. At the other end, switch $SW_2$ is grounded. Switch $SW_2$ receives the second control signal from the switch control circuit 611. Switch $SW_2$ is switched between the ON state and the OFF state in accordance with the second control signal.

At one end, resistor $R_2$ is connected to power source $V_{DD}$, and at the other end, resistor $R_2$ is connected to the negative-phase input terminal of the amplifier 612 and the source terminal of P-type MOS transistor $M_1$.

The amplifier 612 has a positive-phase input terminal connected to the other end of capacitor C, the other end of resistor $R_1$ and one end of switch $SW_2$, has a negative-phase input terminal connected to the other end of resistor $R_2$ and the source terminal of the P-type MOS transistor $M_1$, and has an output terminal connected to the gate terminal of the P-type MOS transistor $M_1$. The amplifier 612 is under the feedback control by means of the P-type MOS transistor $M_1$ such that the voltage signal $V_X$ supplied to the positive-phase input terminal is equal to potential $V_{FB}$ supplied to the negative-phase input terminal.

The P-type MOS transistor $M_1$ has a source terminal connected to the other end of resistor $R_2$ and the negative-phase input terminal of the amplifier 612, has a gate terminal connected to the output terminal of the amplifier 712, and has a drain terminal connected to one end of the current source $I_{BIAS}$. The P-type MOS transistor $M_1$ outputs current signal $I_{OUT}$ (simulation signal) from the drain terminal in accordance with an output of the amplifier 612.

One end of the current source $I_{BIAS}$ is connected to the drain terminal of the P-type MOS transistor $M_1$, and the other end of the current source $I_{BIAS}$ is grounded. The current source $I_{BIAS}$ supplies a bias current to the P-type MOS transistor $M_1$.

Figure 9:
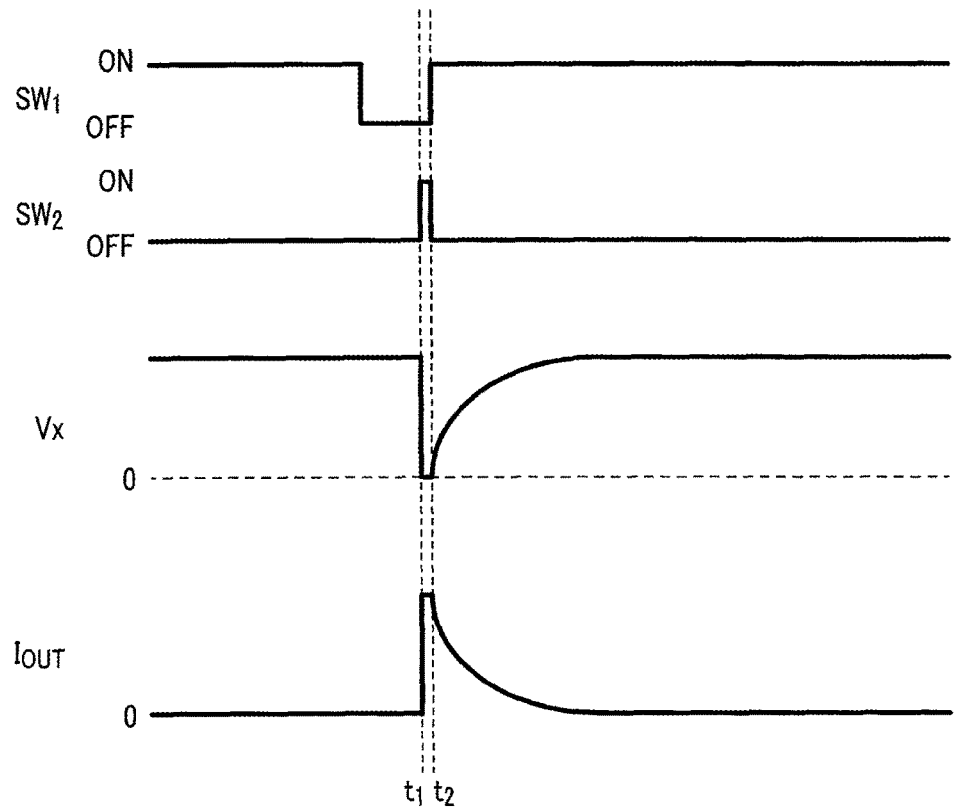
FIG. 9 is a timing chart illustrating an example of how signals of the SiPM simulation signal generating circuit change with time.

FIG. 9 illustrates an example of the relationship among switch $SW_1$, switch $SW_2$, voltage signal $V_X$ and current signal $I_{OUT}$. In FIG. 9, it is assumed that a switch is turned on when an input signal is at the H level and is turned off when the input signal is at the L level.

In the initial state, switch $SW_1$ is set in the ON state and switch $SW_2$ is set in the OFF state. Switch $SW_1$ is turned off at the timing at which a reference timing signal (TRIG) is input, switch $SW_2$ is kept in the ON state in the short time from time $t_1$ to time $t_2$, and at time $t_2$ switch $SW_1$ is turned on and switch $SW_2$ is turned off.

When switch $SW_2$ is turned on at time $t_1$, the charge in capacitor C is released. As a result, the potential of voltage signal $V_X$ drops from reference voltage $V_{REF}$ to GND. Thereafter, when switch $SW_1$ is turned on at time $t_2$, capacitor C is charged by means of resistor $R_1$. Therefore, the potential of voltage signal $V_X$ increases exponentially with time constant $R_1C$ and returns to reference voltage $V_{REF}$ after the elapse of a sufficiently long time.

Voltage signal $V_X$ mentioned above is supplied to the amplifier 612, and is converted into current signal $I_{OUT}$ by means of the amplifier 612, resistor $R_2$ and P-type MOS transistor $M_1$. The amplifier 612 receives potential $V_{FB}$ (which is supplied thereto after being lowered by the voltage drop of resistor $R_2$) and voltage signal $V_X$, and is under the feedback control by means of the P-type MOS transistor $M_1$ such that the two potentials become equal to each other. Therefore, the current flowing through resistor $R_2$ can be expressed by the following formula (1):

$$I_{OUT} = \begin{cases} \dfrac{V_{DD} - V_{REF}}{R_2} - I_{BIAS} & t < t_1 \\ \dfrac{V_{DD}}{R_2} - I_{BIAS} & t_1 \leq t \leq t_2 \\ \dfrac{V_{REF}}{R_2}\exp\left\{-\dfrac{C}{R_1}(t-t_2)\right\} + \dfrac{V_{DD} - V_{REF}}{R_2} - I_{BIAS} & t_2 \leq t \end{cases} \quad (1)$$

Since the potential of voltage signal $V_X$ is $V_{REF}$ in the initial state, a direct current of $V_{REF}/R_2$ flows through resistor $R_2$ and the P-type MOS transistor $M_1$. By setting the current source $I_{BIAS}$ to supply a current of $V_{REF}/R_2$, the current signal $I_{OUT}$ in the initial state can be made zero.

FIG. 10 shows a second specific example of the SiPM simulation signal generating circuit 603. The SiPM simulation signal generating circuit 603 shown in FIG. 10 includes a switch control circuit 621, switches $SW_1$ to $SW_N$, current sources $I_1$ to $I_N$, current source $I_{drive}$, P-type MOS transistor $M_1$, P-type MOS transistor $M_2$, and current source $I_{BIAS}$.

The switch control circuit 621 receives a reference timing signal (TRIG) from the reference timing generating circuit 101. Based on the reference timing signal, the switch control circuit 621 generates control signals SEL[1:N] for respectively controlling switches $SW_1$ to $SW_N$. Each control signal is configured, for example, such that a switch is closed (ON state) when the control signal is at the H level and is opened (OFF state) when the control signal is at the L level. The switch control circuit 621 supplies control signals SEL[1:N] to switches $SW_1$ to $SW_N$, respectively.

At one end, switches $SW_1$ to $SW_N$ are connected to the gate and drain terminals of P-type MOS transistor $M_1$, the drain terminal of P-type MOS transistor $M_2$ and one end of current source $I_{drive}$. At the other end, switches $SW_1$ to $SW_N$ are connected to one-end portions of respective current sources $I_1$ to $I_N$. Switches $SW_1$ to $SW_N$ receive controls signal SEL[1:N] from the switch control circuit 621. Switches $SW_1$ to $SW_N$ are switched between the ON state and the OFF state in accordance with respective control signals SEL[1:N].

At one end, current sources $I_1$ to $I_N$ are connected to the other terminals of switches $SW_1$ to $SW_N$. The other ends of current sources $I_1$ to $I_N$ are grounded. Current sources $I_1$ to $I_N$ are adjusted such that the amount of current supplied by current source $I_1$ is largest and that the amount of current decreases from current sources $I_1$ to $I_N$. Current sources $I_1$ to $I_N$ generate current signals $I_{OUT}$ (simulation signals).

At one end, current source $I_{drive}$ is connected to the gate and drain terminals of P-type MOS transistor $M_1$, the drain terminal of P-type MOS transistor $M_2$ and the one-end portions of switches $SW_1$ to $SW_N$. At the other end, current source $I_{drive}$ is grounded. Current source $I_{drive}$ serves to drive P-type MOS transistor $M_1$.

The source terminal of P-type MOS transistor $M_1$ is connected to power supply $V_{DD}$, and the gate and drain terminals thereof are connected to the gate terminal of P-type MOS transistor $M_2$, one-end portions of switches $SW_1$ to $SW_N$ and one end of current source $I_{drive}$.

The source terminal of P-type MOS transistor $M_2$ is connected to power supply $V_{DD}$, the gate terminal thereof is connected to the gate and drain terminals of P-type MOS transistor $M_1$, one-end portions of switches $SW_1$ to $SW_N$ and one end of current source $I_{drive}$, and the drain terminal thereof is connected to one end of current source $I_{BIAS}$. P-type MOS transistor $M_1$ and P-type transistor $M_2$ jointly constitute a current mirror. P-type MOS transistor $M_2$ outputs current signal $I_{OUT}$ (simulation signal) from the drain terminal in accordance with an output of current sources $I_1$ to $I_N$.

One end of the current source $I_{BIAS}$ is connected to the drain terminal of the P-type MOS transistor $M_2$, and the other end thereof is grounded. The current source $I_{BIAS}$ supplies a bias current to the P-type MOS transistor $M_2$.

FIG. 11 shows a first specific example of the switch control circuit 621. The switch control circuit 621 shown in FIG. 11 includes D flip-flops (D-FFs) 631-1 to 631-N.

D-FF 631-1 receives an L-level signal from power source $V_{SS}$, receives clock signal CLK_PLL from a clock generation circuit (not shown), and receives reference timing signal TRIG from the reference timing generating circuit 101. Based on the L-level signal, reference timing signal and clock signal, D-FF 631-1 supplies control signal SEL[1] to switch $SW_1$ (FIG. 10) and D-FF 631-2.

D-FF 631-2 receives control signal SEL[1] from D-FF 631-1, receives clock signal CLK_PLL from the clock generation circuit (not shown), and receives reference timing signal TRIG from the reference timing generating circuit 101. Based on control signal SEL[1], the reference timing signal and the clock signal, D-FF 631-2 supplies control signal SEL[2] to switch $SW_2$ (FIG. 10) and D-FF 631-3.

D-FF 631-3 receives control signal SEL[2] from D-FF 631-2, receives clock signal CLK_PLL from the clock generation circuit (not shown), and receives reference timing signal TRIG from the reference timing generating circuit 101. Based on control signal SEL[2], the reference timing signal and the clock signal, D-FF 631-3 supplies control signal SEL[3] to switch $SW_3$ (FIG. 10) and D-FF 631-4 (not shown).

D-FF 631-N receives control signal SEL[N−1] from D-FF 631-(N−1), receives clock signal CLK_PLL from the clock generation circuit (not shown), and receives reference timing signal TRIG from the reference timing generating circuit 101. Based on control signal SEL[N−1], the reference timing signal and the clock signal, D-FF 631-N supplies control signal SEL[N] to switch $SW_N$ (FIG. 10).

Figure 12:
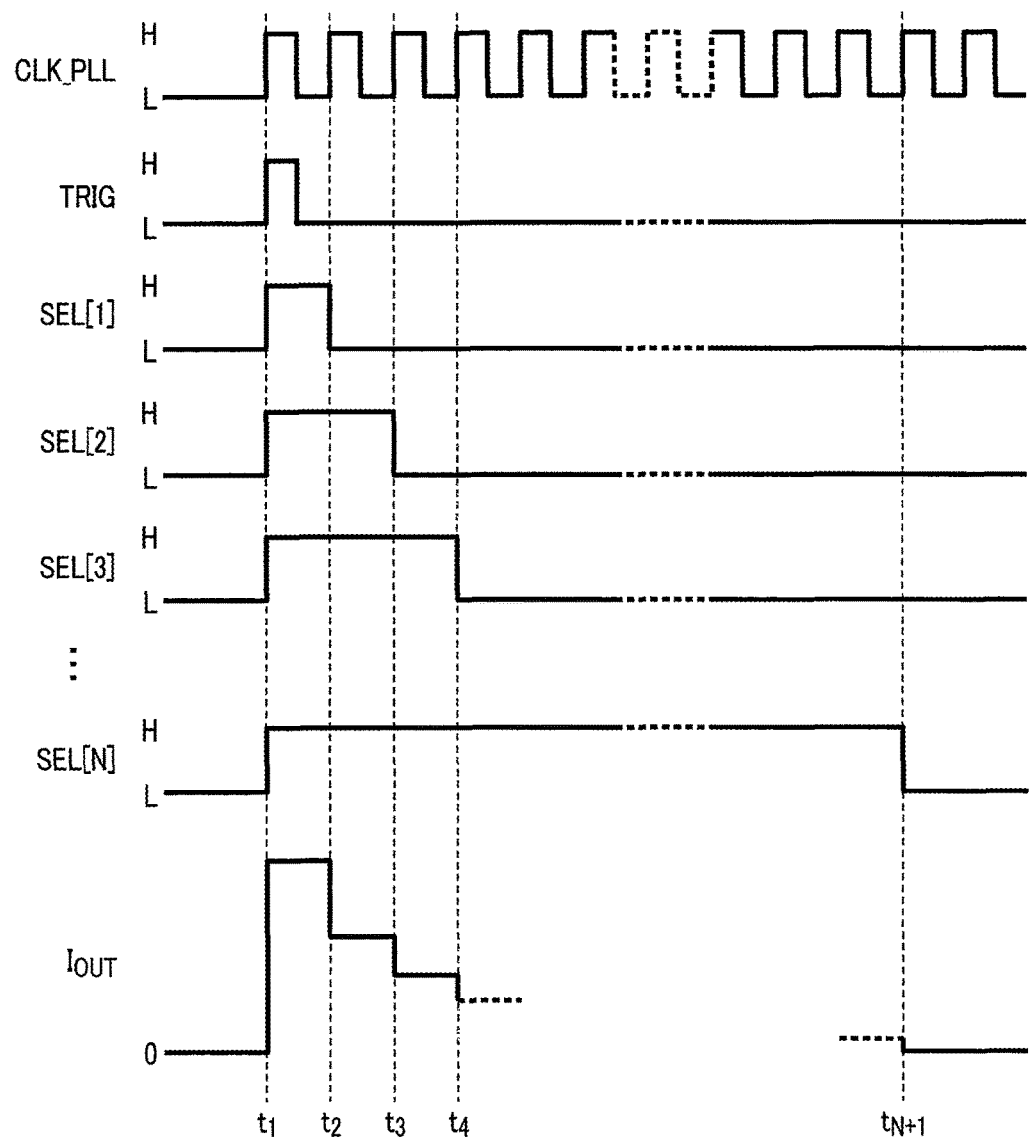
FIG. 12 is a timing chart illustrating an example of how signals of the switch control circuit shown in FIG. 11 change with time.

FIG. 12 illustrates an example of how clock signal CLK signal VLK_PLL, reference timing signal TRIG, control signals SEL[1:N] and current signal $I_{OUT}$ are related to one another, where the switch control circuit 621 shown in FIG. 11 is employed in the SiPM simulation signal generating circuit 603 shown in FIG. 10.

The switch control circuit 621 turns on all switches $SW_1$ to $SW_N$ in response to the input of TRIG (sets all control signals SEL[1:N] at the H level). Thereafter, the switch control circuit 621 turns off switches $SW_1$ to $SW_N$ in turn in each cycle of CLK_PLL (changes all control signals SEL[1:N] from the H level to the L level in turn, starting with SEL[1]).

Since the amount of current supplied to the current mirror reduces each time a switch is turned off, the value of current signal $I_{OUT}$ decreases with time, with the peak value exhibited at the input timing of TRIG. Like current signal IOU shown in FIG. 9, the current value is decreased exponentially with time by adjusting the amounts of current supplied from current sources $I_1$ to $I_N$. Thus, current signal $I_{OUT}$ is a simulation signal that simulates the waveform of an output signal of the SiPM. In the case of the circuit configuration shown in FIG. 11, the time constant of the simulation signal is determined by the current ratios of current sources $I_1$ to $I_N$ and the frequency of CLK_PLL.

Figure 13:
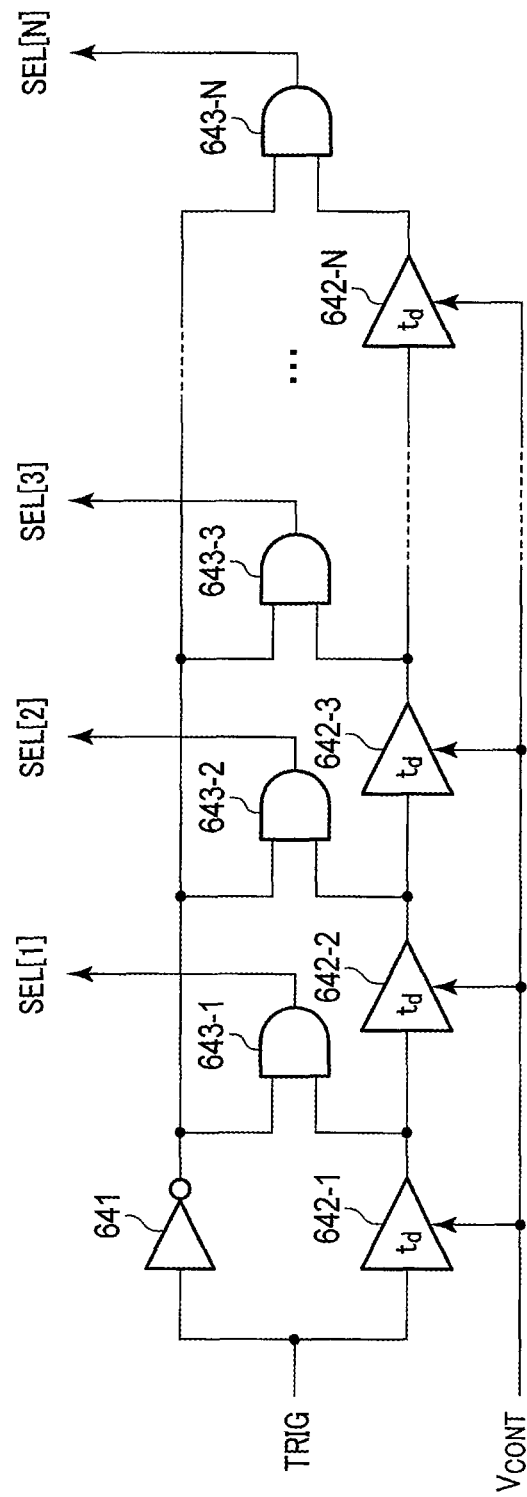
FIG. 13 is a circuit diagram illustrating an example of the switch control circuit shown in FIG. 10.

FIG. 13 shows a second specific example of the switch control circuit 621. The switch control circuit 621 shown in FIG. 13 includes a NOT gate 641, delay elements 642-1 to 642-N, and AND gates 643-1 to 643-N.

The NOT gate 641 receives a reference timing signal (TRIG) from the reference timing generating circuit 101. The NOT gate 641 logically inverts the reference timing signal. The NOT gate 641 supplies the logically-inverted reference timing signal to AND gates 643-1 to 643-N.

Delay element 642-1 receives the reference timing signal TRIG from the reference timing generating circuit and receives control voltage $V_{CONT}$ from a circuit (not shown). Delay element 642-1 sets an output signal by the application of control voltage $V_{CONT}$. Thereafter, delay element 642-1 delays the reference timing signal by time length $t_d$. Delay element 642-1 supplies the reference timing signal delayed by time length $t_d$ to both AND gate 643-1 and delay element 642-2.

AND gate 643-1 receives the logically-inverted reference timing signal from the NOT gate 641 and receives the reference timing signal delayed by time length $t_d$ from delay element 642-1. AND gate 643-1 generates H-level control signal SEL[1] when the logically-inverted reference timing signal and the reference timing signal delayed by time length $t_d$ are both at the H level. AND gate 643-1 supplies control signal SEL[1] to switch $SW_1$ shown in FIG. 10.

Delay element 642-2 receives the reference timing signal delayed by time length $t_d$ from delay element 642-1 and receives control voltage $V_{CONT}$ from the circuit not shown. Delay element 642-2 sets an output signal by the application of control voltage $V_{CONT}$. Thereafter, delay element 642-2 delays the reference timing signal delayed by time length $t_d$ further by time length $t_d$. Delay element 642-2 supplies the reference timing signal delayed by time length $2 \cdot t_d$ to both AND gate 643-2 and delay element 642-3.

AND gate 643-2 receives the logically-inverted reference timing signal from the NOT gate 641 and receives the reference timing signal delayed by time length $2 \cdot t_d$ from delay element 642-2. AND gate 643-2 generates H-level control signal SEL[2] when the logically-inverted reference timing signal and the reference timing signal delayed by time length $2 \cdot t_d$ are both at the H level. AND gate 643-2 supplies control signal SEL[2] to switch $SW_2$ shown in FIG. 10.

Delay element 642-3 receives the reference timing signal delayed by time length $2 \cdot t_d$ from delay element 642-2 and receives control voltage $V_{CONT}$ from the circuit not shown. Delay element 642-3 sets an output signal by the application of control voltage $V_{CONT}$. Thereafter, delay element 642-3 delays the reference timing signal delayed by time length $2 \cdot t_d$ further by time length $t_d$. Delay element 642-3 supplies the reference timing signal delayed by time length $3 \cdot t_d$ to both AND gate 643-3 and delay element 642-4 (not shown).

AND gate 643-3 receives the logically-inverted reference timing signal from the NOT gate 641 and receives the reference timing signal delayed by time length $3 \cdot t_d$ from delay element 642-3. AND gate 643-3 generates H-level control signal SEL[3] when the logically-inverted reference timing signal and the reference timing signal delayed by time length $3 \cdot t_d$ are both at the H level. AND gate 643-3 supplies control signal SEL[3] to switch $SW_3$ shown in FIG. 10.

Delay element 642-N receives the reference timing signal delayed by time length $(N-1) t_d$ from delay element 642-(N-1) and receives control voltage $V_{CONT}$ from the circuit not shown. Delay element 642-N sets an output signal by the application of control voltage $V_{CONT}$. Thereafter, delay element 642-N delays the reference timing signal delayed by time length $(N-1) \cdot t_d$ further by time length $t_d$. Delay element 642-N supplies the reference timing signal delayed by time length $N \cdot t_d$ to AND gate 643-N.

AND gate 643-N receives the logically-inverted reference timing signal from the NOT gate 641 and receives the reference timing signal delayed by time length $N \cdot t_d$ from delay element 642-N. AND gate 643-N generates H-level control signal SEL[N] when the logically-inverted reference timing signal and the reference timing signal delayed by time length $N \cdot t_d$ are both at the H level. AND gate 643-N supplies control signal SEL[N] to switch $SW_N$ shown in FIG. 10.

Figure 14:
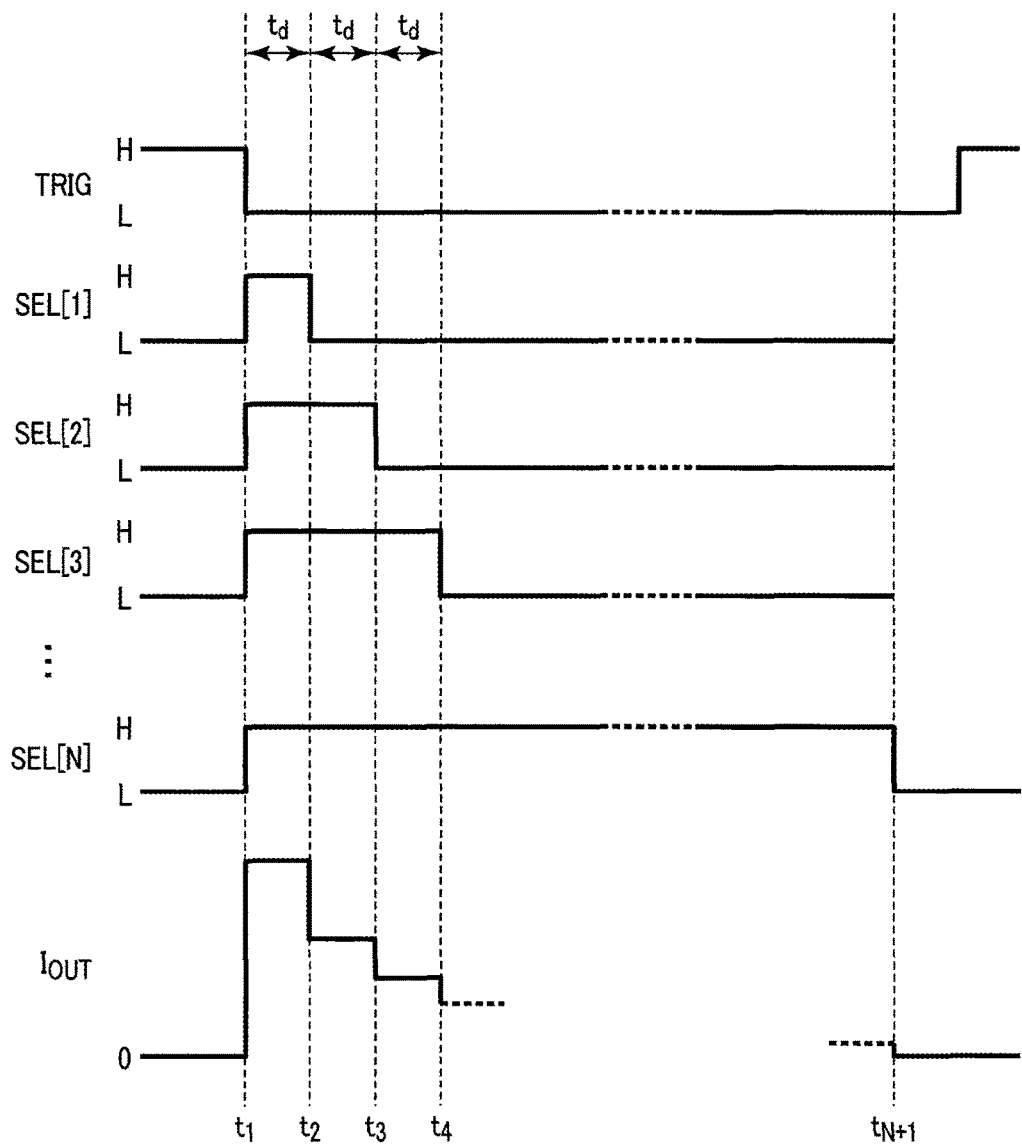
FIG. 14 is a timing chart illustrating an example of how signals of the switch control circuit shown in FIG. 13 change with time.

FIG. 14 illustrates an example of how reference timing signal TRIG, control signals SEL[1:N] and current signal $I_{OUT}$ are related to one another, where the switch control circuit 621 shown in FIG. 13 is employed in the SiPM simulation signal generating circuit 603 shown in FIG. 10.

The switch control circuit 621 turns on all switches $SW_1$ to $SW_N$ in response to the input of TRIG (changing from the H level to the L level) (sets all control signals SEL[1:N] at the H level). Thereafter, the switch control circuit 621 turns off switches $SW_1$ to $SW_N$ in turn in response to the propagation of a signal from delay element 642-1 to 642-N (changes all control signals SEL[1:N] from the H level to the L level in turn, starting with SEL[1]).

Since the amount of current supplied to the current mirror reduces each time a switch is turned off, the value of current signal $I_{OUT}$ decreases with time, with the peak value exhibited at the input timing of TRIG. Like current signal $I_{OUT}$ shown in FIG. 9, the current value is decreased exponentially with time by adjusting the amounts of current supplied from current sources $I_1$ to $I_N$. Thus, current signal $I_{OUT}$ is a simulation signal that simulates the waveform of an output signal of the SiPM. In the case of the circuit configuration shown in FIG. 13, the time constant of the simulation signal is determined by the current ratios of current sources $I_1$ to $I_N$ and the delay times of the delay elements.

The delay time of each delay element can be easily made shorter than the one-cycle period of a clock signal supplied to D-FFs. That is, the switch control circuit 621 can control the switches with a higher time resolution where the delay elements are employed than where the F-FFs are employed. Therefore, the time resolution of a simulation signal is higher in the configuration employing the delay elements than in the configuration employing the D-FFs.

However, the delay times of the delay elements may vary depending upon the characteristic differences among the elements, the ambient temperature variation and the power source voltage. For this reason, it may happen that the circuit employing delay elements cannot easily generate a simulation signal having a time constant equal to the time constant of current signal $I_{OUT}$ shown in FIG. 9. As a method for controlling the time constant of a simulation signal, it is thought to replace a delay element with a delay locked loop (DLL) circuit.

FIG. 15 shows a third specific example of the switch control circuit 621. The switch control circuit 621 shown in FIG. 15 differs from the switch control circuit 621 shown in FIG. 13 in that it additionally uses selector 651, NOT gate 652, a phase comparator 653, a charge pump circuit 654 and a filter 655. Delay elements 642-1 to 642-N, phase comparator 653, charge pump circuit 654 and filter 655 jointly constitute a DLL circuit.

Selector 651 receives selection signal SEL from a control circuit (not shown), receives reference timing signal TRIG from the reference timing generating circuit 101, and receives clock signal CLK_PLL from a clock generating circuit (not shown). Selector 651 supplies either of the reference timing signal and the clock signal to delay element 642-1 in accordance with the selection signal. Where the delay times of delay elements 641-1 to 641-N are adjusted, the selection signal causes selector 651 to output the clock signal.

NOT gate 652 receives clock signal CLK_PLL from a clock generating circuit (not shown). NOT gate 652 logically inverts the clock signal. NOT gate 652 supplies the logically-inverted clock signal to the phase comparator 653.

The phase comparator 653 receives a reference timing signal delayed by time length $N \cdot t_d$ from delay element 642-N, and receives logically-inverted clock signal from NOT gate 652. The phase comparator 653 compares the phase of the reference timing signal delayed by time length $N \cdot t_d$ with the phase of the logically-inverted clock signal, and supplies the result of comparison to the charge pump circuit 654. The result of comparison is a signal indicating "advance", "synchronous" or "delay."

The charge pump circuit 654 receives the result of comparison from the phase comparator 653. The charge pump circuit 654 generates a signal of a control voltage (control voltage signal) used for controlling the delay times of delay elements 642-1 to 642-N in accordance with the result of comparison. The charge pump circuit 654 supplies the control voltage signal to the filter 655.

The filter 655 is a low pass filter (LPF), for example. The filter 655 receives the control voltage signal from the charge pump circuit 654. The filter 655 permits passage of only those components of the control voltage signal which are within a predetermined band and supplies the resultant signal to delay elements 642-1 to 642-N.

Delay elements 642-1 to 642-N receive the filtered control voltage signal from the filter 655. The delay times of delay elements 642-1 to 642-N are controlled based on the filtered control voltage signal.

For example, where the frequency of the reference clock is 100 MHz (1 period: 10 ns), the delay time corresponding to one delay element sequence is 10 ns, and if the one delay element sequence includes twenty delay elements, the delay time of each delay element is 500 ps (=10 ns/20). If the reference clock mentioned above is generated by use of a PLL from a crystal oscillator, a highly-accurate frequency can be obtained. That is, the time constant of a simulation signal can be determined with high accuracy, like that of the reference clock.

In the configuration described above, a silicon photomultiplier is used for the detection of a laser beam. Like the distance measuring apparatus of the first embodiment, the distance measuring apparatus can provide a measurement time period in which the errors between a plurality of time measurement circuits related to distance measurement are corrected. In addition, the distance measuring apparatus can measure a long distance because the light detector thereof can employ a highly-sensitive silicon photomultiplier.

In the distance measuring apparatuses 100, 200, 300, 400 and 500 mentioned above, each detecting element may be a silicon photomultiplier, and the simulation signal generating circuit may generate a simulation signal that simulates the output signal of the silicon photomultiplier.

Seventh Embodiment

A distance measuring apparatus according to the seventh embodiment will be described.

Each of the distance measuring apparatuses 100, 200, 300, 400, 500 and 600 described above is applicable to the distance image photographing apparatus 700 exemplified in FIG. 16. The distance image photographing apparatus 700 can produce a distance image by measuring distances to a plurality of points of a measuring target (or a measuring range). To be specific, the distance image photographing apparatus 700 includes a position controller 701, a driving unit 702, a reflector 703, a distance measuring apparatus 704 and an image generator 705. In FIG. 16, illustration of reflection light L2 is omitted.

The position controller 701 designates a position which is within a photographing range including a measuring target. To be more specific, as shown in FIG. 17, the position controller 701 designates pixel positions $(X_1, Y_1) \ldots (X_M, Y_N)$ within the photographing range 710 of $(M-1) \times (N-1)$ pixels in the raster scan order, and supplies information on the pixel positions to the driving unit 702, distance measuring apparatus 704 and image generator 705. The designation of the pixel positions is not limited to the raster scan, and another method may be used.

The driving unit 702 receives the information on the pixel positions from the position controller 701. The driving unit 702 drives the reflector 703 in accordance with the pixel positions. To be more specific, as shown in FIG. 17, the driving unit 702 drives the reflector 703 such that the reflector 703 scans substantially-parallel straight lines P1 to PN in the photographing range 710 in the horizontal direction while shifting the lines in the vertical direction.

The reflector 703 is an MEMS mirror, for example. Under the control of the driving unit 702, the reflector 703 sequentially changes the inclination angle of its reflection surface and reflects outgoing light L1. The reflector 703 may be made of a plurality of MEMS mirrors; alternatively, it may be a combination of an MEMS mirror and a rotation mirror.

FIG. 18A shows an example of the MEMS mirror 703a. The MEMS mirror 703a has a reflection surface 720a for reflecting outgoing light L1. The reflection surface 720a changes the reflection direction of the outgoing light L1 such that the reflected outgoing light L1 scans the photographing range 710. Also, the reflection surface 720a reflects reflection light L2 (not shown) reflected from the photographing range 710. The reflection surface 720a is rotatable around two intersecting axes of rotation RA1 and RA2. Under the control of the driving unit 702, the MEMS mirror 703a sequentially changes the inclination angle of its reflection surface 720a and thus changes the reflection direction of the outgoing light L1.

FIG. 18B shows an example of the rotation mirror 703b. The rotation mirror 703b is a hexagonal prism whose side surfaces are reflection surfaces 720b for reflecting outgoing light L1. The rotation mirror 703b is rotatable around the axis of rotation RA along the central axis. Under the control of the driving unit 702, the rotation mirror 703b sequentially changes the inclination angle of its reflection surfaces 720b and thus changes the reflection direction of the outgoing light L1.

The distance measuring apparatus 704 correspond to one of distance measuring apparatuses 100, 200, 300, 400, 500 and 600 described above. The distance measuring apparatus 704 receives information on the pixel positions from the position controller 701. The distance measuring apparatus 704 obtains a measurement time period based on the emission time of outgoing light L1 and the incidence time of reflection light L2, and obtains an offset measurement time period in which the errors between a plurality of time measurement circuits are corrected. The distance measuring apparatus 704 supplies information on the offset measurement time period to the image generator 705.

The image generator 705 receives the information on the pixel positions from the position controller 701 and receives the information on the offset measurement time period from the distance measuring apparatus 704. The image generator 705 generates a distance image corresponding to the number of pixels included in the photographing range, based on the information on the offset measurement time periods of the respective pixel positions.

Figure 19:
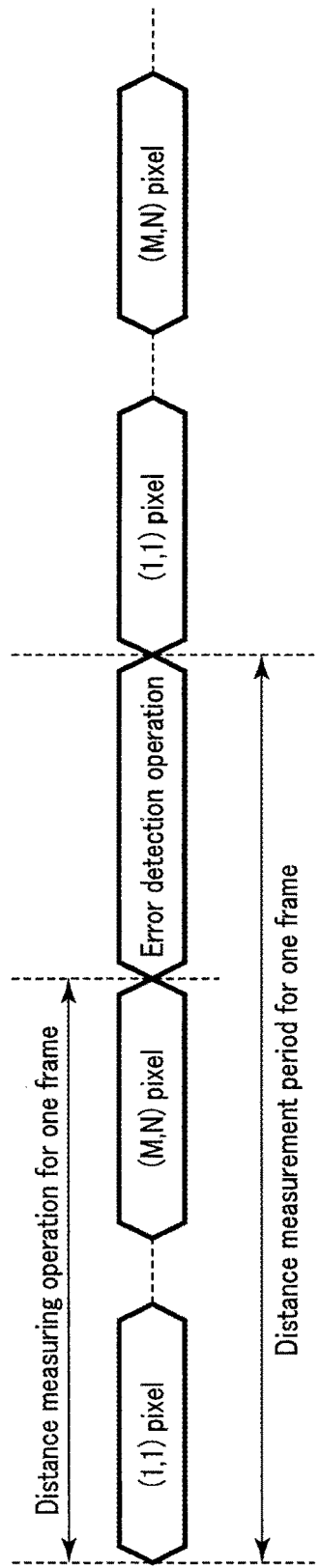
FIG. 19 illustrates an example of an operation phase of the distance image photographing apparatus shown in FIG. 16.

The distance image photographing apparatus 700 operates in such a manner as is exemplified in FIG. 19. In FIG. 19, an error detection operation is performed after the distance measuring operation is performed from the (1, 1) pixel corresponding to pixel position $(X_1, Y_1)$ to the (M, N) pixel corresponding to pixel position $(X_M, Y_N)$ (i.e., the distance measuring operation corresponding to one frame). In other words, the error detection is performed once for one frame. The error detection operation for compensating the error variation due to the ambient temperature variation has to be performed at regular times. In the operation shown in FIG. 19, where twenty images are acquired in one second, the error detection is performed at the intervals of 50 ms. Thus, the ambient temperature variation can be fully compensated.

Figure 20A:
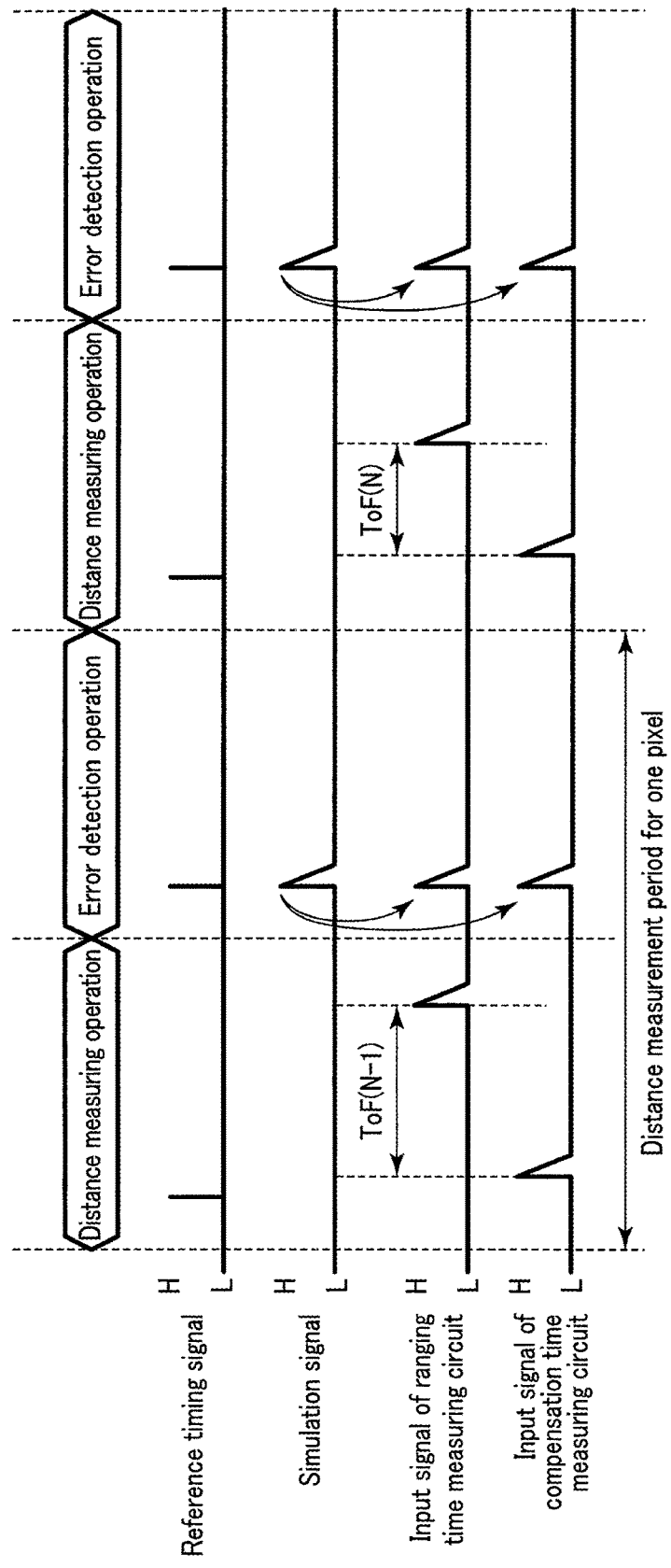
FIG. 20A is a timing chart exemplifying operation phases of the distance image photographing apparatus shown in FIG. 16 and operating timings of signals of the distance image photographing apparatus.

Alternatively, where the time for the distance measuring operation corresponding to one pixel is sufficiently longer than the time required for a laser beam to travel the maximal measurement distance of the distance measuring apparatus 704 back and forth, the distance image photographing apparatus may perform error detection each time the distance measuring operation corresponding to one pixel is performed. To be specific, the distance image photographing apparatus 700 performs an error detection operation after the distance measuring operation corresponding to one pixel is performed, as shown in FIG. 20A. In the error detection operation shown in FIG. 20A, a simulation signal is simultaneously input to both the compensation time measuring circuit and the ranging time measuring circuit, but this is not restrictive. For example, as shown in FIG. 20B, the simulation signal may be input to the compensation time measuring circuit and the ranging time measuring circuit at different timings (for example, with a time lag of $\Delta T_p$).

As described above, the distance image photographing apparatus of the seventh embodiment includes the distance measuring apparatus of one of the above-mentioned embodiments. Hence, the distance image photographing apparatus can provide a measurement time period in which the errors between a plurality of time measurement circuits related to distance measurement are corrected, and therefore enables generation of a highly-accurate distance image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A distance measuring apparatus comprising:
   an irradiator that emits an irradiation wave to a measuring target;
   a first detector that directly detects the irradiation wave;
   a second detector that detects a reflection wave, the reflection wave being the irradiation wave reflected by the measuring target;
   a simulation signal generator that generates a simulation signal, the simulation signal being simulated waveforms of output signals of the first detector and the second detector;
   a first meter that measures a time at which the simulation signal is received to obtain a first time, and that measures a time at which an output signal from the first detector is received to obtain an emission time of the irradiation wave;
   a second meter that measures a time at which the simulation signal is received to obtain a second time, and that measures a time at which an output signal from the second detector is received to obtain an incidence time of the reflection wave;
   a first subtractor that subtracts the emission time from the incidence time to obtain a measurement time period, and that subtracts the first time from the second time to obtain an error time period, the measurement time period being regarded a distance between the irradiator and the measuring target, the error time period being a difference between a delay time of the first meter and a delay time of the second meter; and
   a second subtractor that subtracts the error time period from the measurement time period to obtain an offset measurement time period, the offset measurement time period being the measurement time period corrected for the error time period.

2. The apparatus according to claim 1, wherein
the first meter comprises:
   a first current-to-voltage converter that performs current-to-voltage conversion with respect to the simulation signal or a first current signal to obtain a first voltage signal, the first current signal being an output signal from the first detector;
   a first analog-to-digital converter that performs analog-to-digital conversion with respect to the first voltage signal to obtain first voltage signal information, the first voltage signal information being a digitized numerical sequence in which a voltage value at each point of time from rise of the first voltage signal to fall thereof is digitally expressed; and
   a first time calculation processor that calculates the first time or the emission time, based on the first voltage signal information, and the second meter comprises:
- a second current-to-voltage converter that performs current-to-voltage conversion with respect to the simulation signal or a second current signal to obtain a second voltage signal, the second current signal being an output signal from the second detector;
- a second analog-to-digital converter that performs analog-to-digital conversion with respect to the second voltage signal to obtain second voltage signal information, the second voltage signal information a digitized numerical sequence in which a voltage value at each point of time from rise of the second voltage signal to fall thereof is digitally expressed; and
- a second time calculation processor that calculates the second time or the incidence time, based on the second voltage signal information.

3. The apparatus according to claim 1, further comprising:
a threshold value generator that generates a threshold voltage, the threshold voltage having a predetermined voltage value,
wherein the first meter comprises:
- a first current-to-voltage converter that performs current-to-voltage conversion with respect to the simulation signal or a first current signal to obtain a first voltage signal, the first current signal being an output signal from the first detector;
- a first comparator that compares a voltage of the first voltage signal and the threshold voltage with each other, and generates a first time signal based on a comparison result; and
- a first time-to-digital converter that performs time-to-digital conversion with respect to the first time signal to calculate the first time or the emission time, and the second meter comprises:
- a second current-to-voltage converter that performs current-to-voltage conversion with respect to the simulation signal or a second current signal to obtain a second voltage signal, the second current signal being an output signal from the second detector;
- a second comparator that compares a voltage of the second voltage signal and the threshold voltage with each other, and generates a second time signal based on a comparison result; and
- a second time-to-digital converter that performs time-to-digital conversion with respect to the second time signal to calculate the second time or the incidence time.

4. The apparatus according to claim 1, wherein
the simulation signal generator generates a plurality of simulation signals of different amplitudes,
the first meter comprises:
- a first current-to-voltage converter that performs current-to-voltage conversion with respect to the simulation signal or a first current signal to obtain a first voltage signal, the first current signal being an output signal from the first detector;
- a first processor that generates a first time signal indicative of timing at which an first attenuation signal and a first delay signal are simultaneous, the first attenuation signal being obtained by attenuating the first voltage signal, the first delay signal being obtained by delaying the first voltage signal; and
- a first time-to-digital converter that performs time-to-digital conversion with respect to the first time signal to calculate the first time or the emission time, and the second meter comprises:
- a second current-to-voltage converter that performs current-to-voltage conversion with respect to the simulation signal or a second current signal to obtain a second voltage signal, the second current signal being an output signal from the second detector;
- a second processor that generates a second time signal indicative of timing at which a second attenuation signal and a second delay signal are simultaneous, the second attenuation signal being obtained by attenuating the second voltage signal, the second delay signal being obtained by delaying the second voltage signal; and
- a second time-to-digital converter that performs time-to-digital conversion with respect to the second time signal to calculate the second time or the incidence time, the apparatus further comprising
an offset parameter calculation processor that calculates an offset parameter used for correcting an amplitude-dependent measurement error, based on first times and second times calculated based on the simulation signals of different amplitudes,
wherein the first processor and the second processor include internal circuits whose parameters are set based on the offset parameter.

5. The apparatus according to claim 1, further comprising
a calculator that calculates the distance based on the offset measurement time period.

6. The apparatus according to claim 2, further comprising:
a third detector that detects the reflection wave;
a third meter that measures a time at which the simulation signal is received to obtain a third time, and that measures a time at which an output signal from the third detector is received to obtain a second incidence time of the reflection wave;
a third subtractor that subtracts the emission time from the second incidence time to obtain a second measurement time period, and that subtracts the first time from the third time to obtain a second error time period, the second measurement time period being regarded a second distance between the irradiator and the measuring target, the second error time period being a difference between a delay time of the first meter and a delay time of the third meter;
a fourth subtractor that subtracts the second error time period from the second measurement time period to obtain a second offset measurement time period, the second offset measurement time period being the second measurement time period corrected for the second error time period; and
a threshold value generator that generates a threshold voltage, the threshold voltage having a predetermined voltage value,
wherein the third meter comprises:
- a third current-to-voltage converter that performs current-to-voltage conversion with respect to the simulation signal or a third current signal to obtain a third voltage signal, the third current signal being an output signal from the third detector;
- a third comparator that compares a voltage of the third voltage signal and the threshold voltage with each other, and generates a third time signal based on a comparison result; and
- a third time-to-digital converter that performs time-to-digital conversion with respect to the third time signal to calculate the third time or the second incidence time.

7. The apparatus according to claim 6, further comprising
a calculator that calculates the distance based on the offset measurement time period, and that calculates the second distance based on the second offset measurement time period.

8. The apparatus according to claim 1, wherein:
at least one of the first detector and the second detector includes a silicon photomultiplier, and
the simulation signal generator generates a simulation signal, the simulation signal being simulated a waveform of an output signal of the silicon photomultiplier.

9. The apparatus according to claim 6, wherein:
at least one of the first detector, the second detector, and the third detector includes a silicon photomultiplier, and
the simulation signal generator generates a simulation signal which simulates a waveform of an output signal of the silicon photomultiplier.

10. A distance image photographing apparatus comprising:
a distance measuring apparatus as defined in claim 1;
a position controller that designates a position within a photographing range including the measuring target; and
an image generator that generates a distance image corresponding to the photographing range, based on the offset measurement time period corresponding to the position.

* * * * *